US012117607B2

(12) United States Patent
Gleason et al.

(10) Patent No.: US 12,117,607 B2
(45) Date of Patent: Oct. 15, 2024

(54) MICRO-ELECTRO-MECHANICAL SYSTEM (MEMS) MICRO-MIRROR ARRAY STEERED LASER TRANSMITTER AND SITUATIONAL AWARENESS SENSOR WITH WAVELENGTH CONVERSION

(71) Applicant: Raytheon Company, Tewksbury, MA (US)

(72) Inventors: Benn H. Gleason, Tucson, AZ (US); Gerald P. Uyeno, Tucson, AZ (US); Sean D. Keller, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 677 days.

(21) Appl. No.: 17/242,861

(22) Filed: Apr. 28, 2021

(65) Prior Publication Data

US 2022/0350133 A1 Nov. 3, 2022

(51) Int. Cl.
| | |
|---|---|
| H01S 3/08 | (2023.01) |
| G01S 7/481 | (2006.01) |
| G01S 17/89 | (2020.01) |
| G02B 26/08 | (2006.01) |
| H01S 3/00 | (2006.01) |

(52) U.S. Cl.
CPC ........ *G02B 26/0833* (2013.01); *G01S 7/4811* (2013.01); *G01S 17/89* (2013.01); *H01S 3/0071* (2013.01); *H01S 3/08059* (2013.01)

(58) Field of Classification Search
CPC ........ G02B 26/0833; G02B 5/09; G02B 5/10; G01S 7/4811; G01S 17/89; G01S 7/4817; H01S 3/0071; H01S 3/08059; H01S 3/0608; H01S 3/09415; H01S 3/10007; H01S 3/101; H01S 3/2325

USPC ................................................................ 372/9
See application file for complete search history.

(56) References Cited

U.S. PATENT DOCUMENTS

| | | | |
|---|---|---|---|
| 5,404,375 A | 4/1995 | Kroeger et al. | |
| 5,854,702 A | 12/1998 | Ishikawa et al. | |
| 6,181,450 B1 | 1/2001 | Dishman et al. | |
| 6,271,953 B1 | 8/2001 | Dishman et al. | |
| 6,327,063 B1 | 12/2001 | Rockwell | |

(Continued)

FOREIGN PATENT DOCUMENTS

WO WO-2014200581 A2 12/2014

OTHER PUBLICATIONS

"MEMS Mirror Array—Beam Steering Mode", [Online]. Retrieved from the Internet: <www.youtube.com/watch?v=wHIUU3kKtzM>, (Aug. 10, 2017), 2 pgs.

(Continued)

*Primary Examiner* — Vu A Vu
(74) *Attorney, Agent, or Firm* — Schwegman Lundberg & Woessner, P.A.

(57) ABSTRACT

A steerable laser transmitter and active situational awareness sensor that achieves SWaP-C, steering rate and spectral diversity improvements by scanning a beam with a Micro-Electro-Mechanical System (MEMS) Micro-Minor Array (MMA). One or more sections of non-linear material (NLM) positioned in the optical path (e.g. as annular sections around a conic mirror or as reflective optical coatings on the MMA) are used to convert the wavelength of the beam to a different wavelength while preserving the steering of the beam. The MEMS MMA may include piston actuation of the mirrors to shape the spot-beam.

20 Claims, 19 Drawing Sheets

(56) References Cited

U.S. PATENT DOCUMENTS

| | | | |
|---|---|---|---|
| 6,567,574 B1 | 5/2003 | Ma et al. | |
| 6,792,028 B2 | 9/2004 | Cook et al. | |
| 6,898,341 B2 * | 5/2005 | Huang | G02B 6/3586 |
| | | | 385/24 |
| 6,947,629 B2 * | 9/2005 | Chu | G02B 6/359 |
| | | | 385/47 |
| 7,304,296 B2 | 12/2007 | Mills et al. | |
| 7,593,641 B2 | 9/2009 | Tegge, Jr. | |
| 7,626,152 B2 | 12/2009 | King et al. | |
| 7,660,235 B2 | 2/2010 | Alicherry et al. | |
| 7,969,558 B2 | 6/2011 | Hall | |
| 8,301,027 B2 | 10/2012 | Shaw et al. | |
| 8,305,578 B1 | 11/2012 | Mudge et al. | |
| 8,311,372 B2 | 11/2012 | Anderson et al. | |
| 8,368,889 B2 | 2/2013 | Schwiegerling et al. | |
| 8,380,025 B2 | 2/2013 | Anderson et al. | |
| 8,463,080 B1 | 6/2013 | Anderson et al. | |
| 8,767,190 B2 | 7/2014 | Hall | |
| 8,823,848 B2 | 9/2014 | Chipman et al. | |
| 8,891,915 B2 * | 11/2014 | Wang | G02B 6/3548 |
| | | | 385/20 |
| 8,983,293 B2 | 3/2015 | Frankel et al. | |
| 9,366,823 B1 * | 6/2016 | McCauley | G01C 19/5712 |
| 9,473,768 B2 | 10/2016 | Uyeno et al. | |
| 9,477,135 B1 | 10/2016 | Uyeno et al. | |
| 9,632,166 B2 | 4/2017 | Trail et al. | |
| 9,857,226 B2 | 1/2018 | LeMaster et al. | |
| 9,904,081 B2 * | 2/2018 | Uyeno | G01S 17/89 |
| 9,927,515 B2 * | 3/2018 | Keller | G01S 7/4817 |
| 10,148,056 B2 | 12/2018 | Uyeno et al. | |
| 10,209,439 B2 | 2/2019 | Keller et al. | |
| 10,243,654 B1 | 3/2019 | Uyeno et al. | |
| 10,267,915 B2 | 4/2019 | Uyeno et al. | |
| 10,324,170 B1 * | 6/2019 | Engberg, Jr. | G01S 7/4818 |
| 10,381,701 B2 | 8/2019 | Motoi | |
| 10,437,045 B2 * | 10/2019 | Zhao | G02B 26/08 |
| 10,444,492 B2 | 10/2019 | Hopkins et al. | |
| 10,613,324 B2 * | 4/2020 | Aoki | B60K 35/00 |
| 10,718,491 B1 | 7/2020 | Raring et al. | |
| 10,969,598 B2 | 4/2021 | Fest et al. | |
| 10,998,965 B2 | 5/2021 | Tong et al. | |
| 11,042,025 B2 | 6/2021 | Uyeno et al. | |
| 11,333,879 B2 | 5/2022 | Uyeno et al. | |
| 2002/0141689 A1 | 10/2002 | Qian et al. | |
| 2002/0196506 A1 | 12/2002 | Graves et al. | |
| 2003/0062468 A1 | 4/2003 | Byren et al. | |
| 2003/0081321 A1 | 5/2003 | Moon et al. | |
| 2003/0185488 A1 | 10/2003 | Blumenthal | |
| 2004/0072540 A1 | 4/2004 | Wilson et al. | |
| 2004/0081466 A1 | 4/2004 | Walther et al. | |
| 2004/0141752 A1 | 7/2004 | Shelton et al. | |
| 2004/0258415 A1 | 12/2004 | Boone et al. | |
| 2005/0031255 A1 | 2/2005 | Schroeder et al. | |
| 2005/0100339 A1 | 5/2005 | Tegge | |
| 2005/0122566 A1 | 6/2005 | Cicchiello | |
| 2005/0288031 A1 | 12/2005 | Davis et al. | |
| 2006/0038103 A1 | 2/2006 | Helmbrecht | |
| 2007/0031157 A1 | 2/2007 | Yamada et al. | |
| 2007/0036480 A1 | 2/2007 | Wu | |
| 2008/0050064 A1 | 2/2008 | Sakai et al. | |
| 2010/0149533 A1 | 6/2010 | Fest | |
| 2010/0166430 A1 | 7/2010 | Alten | |
| 2012/0002973 A1 | 1/2012 | Bruzzi et al. | |
| 2012/0008133 A1 | 1/2012 | Silny et al. | |
| 2012/0114337 A1 | 5/2012 | Aoki | |
| 2012/0155885 A1 | 6/2012 | Hannah et al. | |
| 2012/0168605 A1 | 7/2012 | Milanovic | |
| 2013/0271818 A1 | 10/2013 | Bastien et al. | |
| 2014/0063299 A1 | 3/2014 | Fest et al. | |
| 2015/0099476 A1 | 4/2015 | Beals | |
| 2015/0172218 A1 | 6/2015 | Beshai | |
| 2015/0311981 A1 | 10/2015 | Inagaki et al. | |
| 2015/0378242 A1 | 12/2015 | Auxier et al. | |
| 2016/0003677 A1 | 1/2016 | Pezzaniti et al. | |
| 2016/0043800 A1 | 2/2016 | Kingsbury et al. | |
| 2016/0234703 A1 | 8/2016 | Aldana et al. | |
| 2016/0294472 A1 | 10/2016 | Palmer et al. | |
| 2017/0293137 A1 | 10/2017 | Zhao et al. | |
| 2018/0231715 A1 | 8/2018 | Bishop et al. | |
| 2019/0066320 A1 | 2/2019 | Uyeno et al. | |
| 2019/0154921 A1 | 5/2019 | Xing et al. | |
| 2020/0244359 A1 | 7/2020 | Csonka et al. | |
| 2021/0088776 A1 | 3/2021 | Uyeno et al. | |
| 2021/0091854 A1 | 3/2021 | Uyeno et al. | |
| 2021/0092260 A1 | 3/2021 | Uyeno et al. | |
| 2022/0236383 A1 | 7/2022 | Uyeno et al. | |
| 2022/0260685 A1 | 8/2022 | Keller et al. | |
| 2022/0260827 A1 | 8/2022 | Keller et al. | |
| 2022/0342201 A1 | 10/2022 | Gleason et al. | |

OTHER PUBLICATIONS

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

"U.S. Appl. No. 17/007,917, Notice of Allowance mailed Jan. 10, 2022", 14 pgs.

"U.S. Appl. No. 17/007,917, Supplemental Notice of Allowability mailed Apr. 19, 2022", 2 pgs.

"U.S. Appl. No. 16/871,602, Non Final Office Action mailed Nov. 9, 2020", 18 pgs.

"U.S. Appl. No. 16/871,602, Notice of Allowance mailed Feb. 24, 2021", 5 pgs.

"U.S. Appl. No. 16/871,602, Response filed Feb. 8, 2021 to Non Final Office Action mailed Nov. 9, 2020", 12 pgs.

"U.S. Appl. No. 17/007,917, Non Final Office Action mailed Aug. 3, 2021", 35 pgs.

"U.S. Appl. No. 17/007,917, Response filed Dec. 1, 2021 to Non Final Office Action mailed Aug. 3, 2021", 16 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Kim, et al., "Demonstration of large-angle nonmechanical laser beam steering based on LC polymer polarization grating", Proc. of SPIE vol. 8052 80520T, (May 13, 2011), 13 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Wang, Jinxue, et al., "Doppler Winds Lidar Technology Development and Demonstration", AIAA-2005-6772, Space 2005, Long Beach, California, Aug. 30-1, 2005, (2005), 11 pgs.

Yamamoto, R., et al., "Evolution of a Solid State Laser", Proc. SPIE 6552, Laser Source Technology for Defense and Security III, 655205, (May 10, 2007), 11 pgs.

(56) References Cited

OTHER PUBLICATIONS

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kim, Jihwan, et al., "Wide-angle, nonmechanical beam steering using thin liquid crystal polarization gratings", Proc. of SPIE, vol. 7093, (2008), 12 pgs.

\* cited by examiner

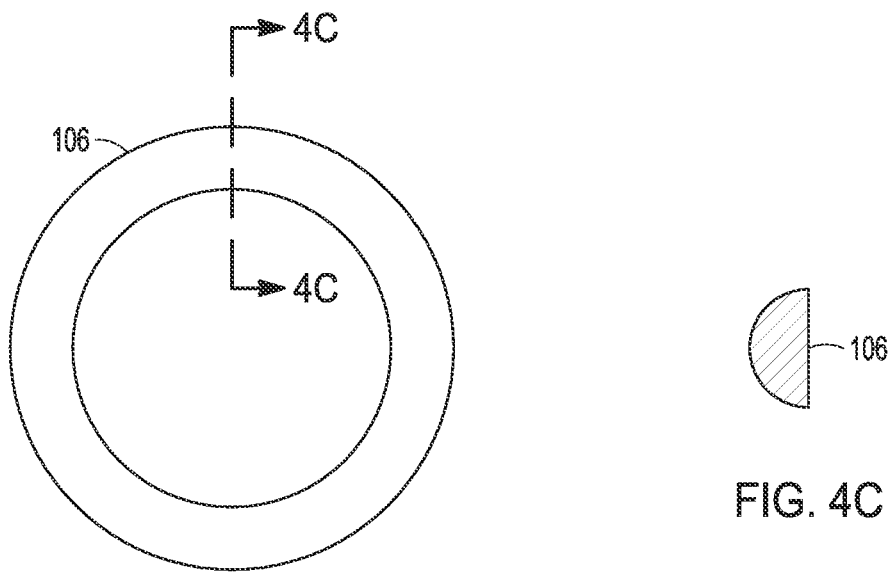
FIG. 4B
FIG. 4C
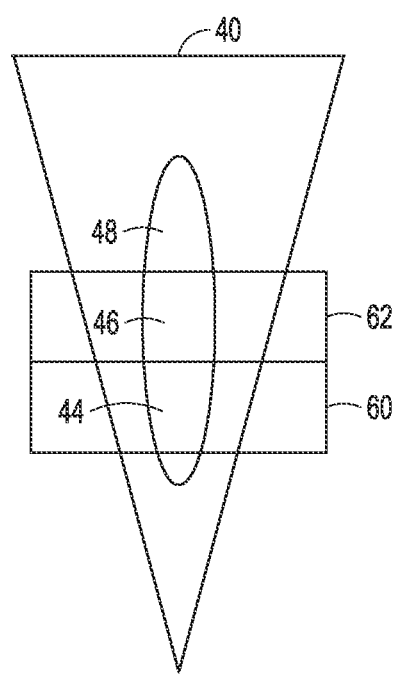
FIG. 4D

MICRO-ELECTRO-MECHANICAL SYSTEM (MEMS) MICRO-MIRROR ARRAY STEERED LASER TRANSMITTER AND SITUATIONAL AWARENESS SENSOR WITH WAVELENGTH CONVERSION

BACKGROUND OF THE INVENTION

Field of the Invention

This invention relates to steerable laser transmitters and situational awareness sensors, and more particularly to the use of a Micro-Electro-Mechanical System (MEMS) Micro-Mirror Array and conic mirror to steer a laser spot-beam over a sensor field-of-regard (FOR) in combination with non-linear material to convert the wavelength of the laser spot-beam to one or more different wavelengths while preserving the steering of the spot-beam.

Description of the Related Art

Situational awareness is the perception of environmental elements with respect to time or space, the comprehension of their meaning, and the projection of their status after some variable has changed, such as time, or some other variable, such as a predetermined event. Situational awareness is critical in complex, dynamic systems such as aviation, air traffic control, ship navigation, collision avoidance, object targeting etc.

Situational awareness sensors may be passive or active. Passive sensors use a detector and ambient energy to detect and track objects in the sensor's FOR. Active sensors use a laser to illuminate objects in the FOR and a detector to detect reflected energy. The active sensor may be configured to produce an intensity image or a range map of the illuminated object. Active sensors have the advantages of illuminating a target with a laser and being able to provide range information. However, lasers can be large and expensive and raise the overall "SWaP-C" (size, weight, power and cost) of the sensor.

One type of active sensor uses flash illumination to simultaneously illuminate the entire FOR and a pixelated detector to detect reflected energy. This approach requires a laser with a lot of power, hence size, weight and cost, to provide the requisite energy density over the FOR to detect objects at typical distances. Flash illumination also produces atmospheric backscatter that reduces the signal-to-noise ratio (SNR) of the detected objects. Flash illumination does have the benefit of no moving parts.

Another type of active sensor uses a single laser to generate a collimated spot-beam within a narrow field-of-view (FOV). A mirror is physically rotated to scan the collimated spot-beam over a 360 degree horizontal FOR. The entire sensor may be actuated up and down to scan a desired vertical FOR. A single detector senses a reflected component of the spot-beam. This approach can use a less powerful laser and reduces atmospheric backscattering but is mechanically scanned. Mechanical scanning has a large SWaP-C due to the size of the mechanical structures and motors.

Velodyne Lidar offers a suite of LIDAR sensors that provide a 360 degree horizontal FOR and a 30-40 degree vertical FOR for real-time autonomous navigation, 3D mobile mapping and other LIDAR applications (U.S. Pat. Nos. 7,969,558 and 8,767,190). The LIDAR sensor includes a base, a housing, a plurality of photon transmitters and photon detectors contained within the housing, a rotary motor that rotates the housing about the base, and a communication component that allows transmission of signals generated by the photon detectors to external components. The photon transmitters and detectors of each pair are held in a fixed relationship with each other. The rotary component includes a rotary power coupling configured to provide power from an external source to the rotary motor, the photon transmitters, and the photon detectors. This approach uses many small emitter/detector pairs but requires mechanical rotation to scan the horizontal FOR.

U.S. Pat. No. 9,904,081 entitled "LCWG Steered Laser Transmitter and Situational Awareness Sensor with Wavelength Conversion" uses a liquid crystal waveguide (LCWG) to steer a spot-beam onto a fixed mirror including one or more conic sections, which in turn redirect the spot-beam to scan a FOR. The spot-beam passes through one or more annular sections of non-linearly material (NLM) formed along the axis and around the conic sections of the fixed mirror. Each NLM section converts the wavelength of the spot-beam to a different wavelength while preserving the steering of the spot-beam. The LCWG may shape or move the spot-beam along the axis of the conic section of the fixed mirror to sequentially, time or time and spatially multiplex the spot-beam between the original and different wavelengths. This provides multispectral capability from a single laser source. The transmitter also supports steering the spot-beam at a wavelength at which the LCWG cannot steer directly.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a steerable laser transmitter and active situational awareness sensor that achieves SWaP-C, steering rate and spectral diversity improvements by scanning a beam with a Micro-Electro-Mechanical System (MEMS) Micro-Mirror Array (MMA). One or more sections of non-linear material (NLM) positioned in the optical path are used to convert the wavelength of the beam to a different wavelength while preserving the steering of the beam.

In an embodiment, a laser is configured to generate a beam of optical radiation at an input wavelength. A fixed mirror including one or more conically shaped sections, each rotationally symmetric about an optical axis, is positioned with one or more apex angles at different positions along the optical axis. A MEMS MMA including a plurality of mirrors responsive to command signals to at least tip and tilt in two degrees-of-freedom (2 DOF) is positioned to receive the beam and cause the beam to be focused into a spot-beam onto one or more of the conically shaped sections of the fixed mirror and to steer the spot-beam about the optical axis to scan a field-of-regard (FOR) around the optical axis. One or more sections of optical non-linear material (NLM) are positioned in an optical path of the spot-beam (e.g. annularly around the conically shaped sections or as reflective coatings on the mirrors) to convert the input wavelength to one or more different output wavelengths while preserving the steering of the spot-beam over the FOR.

In an embodiment of the conically-scanned device, the MEMS MMA is partitioned into a plurality of segments, each segment including a plurality of mirrors, and is responsive to command signals to tip and tilt the mirrors in each segment steer a plurality of spot beams onto different locations of the fixed mirror and scan the plurality of spot beams over the FOR.

In an embodiment of the conically-scanned device, the mirrors are configured to tip, tilt and piston in 3 DOF to shape the spot-beam. In particular, the wavefront of the spot-beam may be shaped to compensate for such things as atmospheric distortion or to maintain a zero phase difference across the wavefront.

In an embodiment of the conically-scanned device, the mirrors of the MEMS MMA approximate an off-axis section of a parabolic surface to focus the beam into the spot-beam on the one or more conically shaped sections of the fixed mirror. The curvature of the off-axis section may be formed by piston actuation of the mirrors in a $3^{rd}$ DOF, by position multiple flat MEMS MMAs on facets of a support structure that in combination approximate the desired curvature or by forming the MEMS MMA with desired curvature, either a rigid substrate with the desired curvature or a conformal substrate that is applied to a support structure having the desired curvature.

In an embodiment of the conically-scanned device, the MEMS MMA tips and tilts the mirrors to steer the beam onto different off-axis sections of a parabolic mirror that re-directs and focuses the beam into the spot-beam on the one or more conically shaped sections of the fixed mirror.

In an embodiment of the conically-scanned device, the laser generates a broadbeam including multiple different input wavelengths. The mirrors include reflective optical coatings that reflect at different input wavelengths. The output wavelength or more generally the spectral composition of the steered beam can thus be controlled by selecting the desired input wavelength or wavelengths to form and steer the beam the through the one or more sections of optical NLM material.

In an embodiment of the conically-scanned device, the sections of NLM are provided as both coatings on the mirrors and annular sections around the one or more conically shaped sections of the fixed mirror. In this hybrid configuration, the beam may undergo two wavelength conversions, one at the surface of the mirrors and one as the spot-beam is reflected off of the fixed mirror. Furthermore, the MEMS MMA can be controlled to mix and match different wavelength conversions from the optical coatings with different wavelength conversions from the annular sections providing great flexibility to control the spectral content of the one or more scanned beams.

The conically-scanned device may be positioned in any horizontal or vertical direction and may rapidly scan a 360° horizontal FOR in the plane perpendicular to the axis of the device with a specified vertical FOR perpendicular to the plane of the scan. The device may also scan any portion of the FOR, jump between multiple discrete objects per frame, vary the dwell time on an object or compensate for other external factors to tailor the scan to a particular application or changing real-time conditions. The MEMS MMA may shape or move the spot-beam along the axis of the conic mirror to sequentially, time or time and spatially multiplex the spot-beam between the original and different wavelengths while preserving the steering of the spot-beam. The input wavelength may be preserved as one of the output wavelengths by omitting a section of NLM. The input wavelength may be preserved as one of the output wavelengths by omitting a section of NLM. A 1.06 micron laser may be converted to 1.55 micron or 0.532 micron or left as 1.06 micron. The 1.06 micron (IR) laser may be converted to 0.532 micron (visible), 0.34 micron (ultraviolet) or 8-12 micron (LWIR). This provides multispectral capability from a single laser source.

In an embodiment, a laser is configured to generate a beam of optical radiation at an input wavelength. A MEMS MMA is positioned to receive the beam. The MEMS MMA includes a plurality of mirrors having reflective coatings formed of at least an optical non-linear material (NLM) to convert the input wavelength to a different]output wavelength. All of the mirrors may have the same NLM coating, different coatings or some may have no NLM to preserve the input wavelength. The mirrors are responsive to command signals to at least tip and tilt in two degrees-of-freedom (2 DOF) to steer the beam to scan a field-of-regard (FOR). In certain configurations, the beam is focused to a spot-beam and scanned around an optical axis on the one or more conically shaped sections of a fixed mirror to scan the FOR. With NLM coatings, the device can form and scan a multispectral beam with a simple conic mirror, a multi-segmented conic mirror is not required. However, a multi-segmented conic mirror may be used to simultaneously form and independently scan multiple single-wavelength beams.

In an embodiment, a laser is configured to generate a beam of optical radiation at an input wavelength. A MEMS MMA including a plurality of mirrors responsive to command signals to at least tip, tilt and piston in three degrees-of-freedom 3 DOF) is positioned to shape the wavefront of the beam and steer the beam in two-dimensions to scan a FOR. One or more sections of optical non-linear material (NLM) are positioned in an optical path of the beam (e.g. annularly around conically shaped sections of a fixed mirror or as reflective coatings on the mirrors) to convert the input wavelength to one or more different output wavelengths while preserving the steering of the beam over the FOR.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4A-4D illustrate a side view, axial and section views of the L0 optic, and a top view of the spot-beam overlaid on the NLM sections and conic mirror for a simultaneous scan of the multispectral wavelengths;

DETAILED DESCRIPTION OF THE INVENTION

The present invention provides a steerable laser transmitter and situational awareness sensor that achieves SWaP-C, steering rate and spectral diversity improvements by scanning a beam with a Micro-Electro-Mechanical System (MEMS) Micro-Mirror Array (MMA). One or more sections of non-linear material (NLM) positioned in the optical path (e.g. annular sections of NLM around a conic mirror or reflective coatings of NLM on the mirrors) are used to convert the wavelength of the beam to a different wavelength while preserving the steering of the beam. In addition to tip and tilt to steer the beam, the mirrors may be able to piston to shape the wavefront of the beam.

Figure 1:
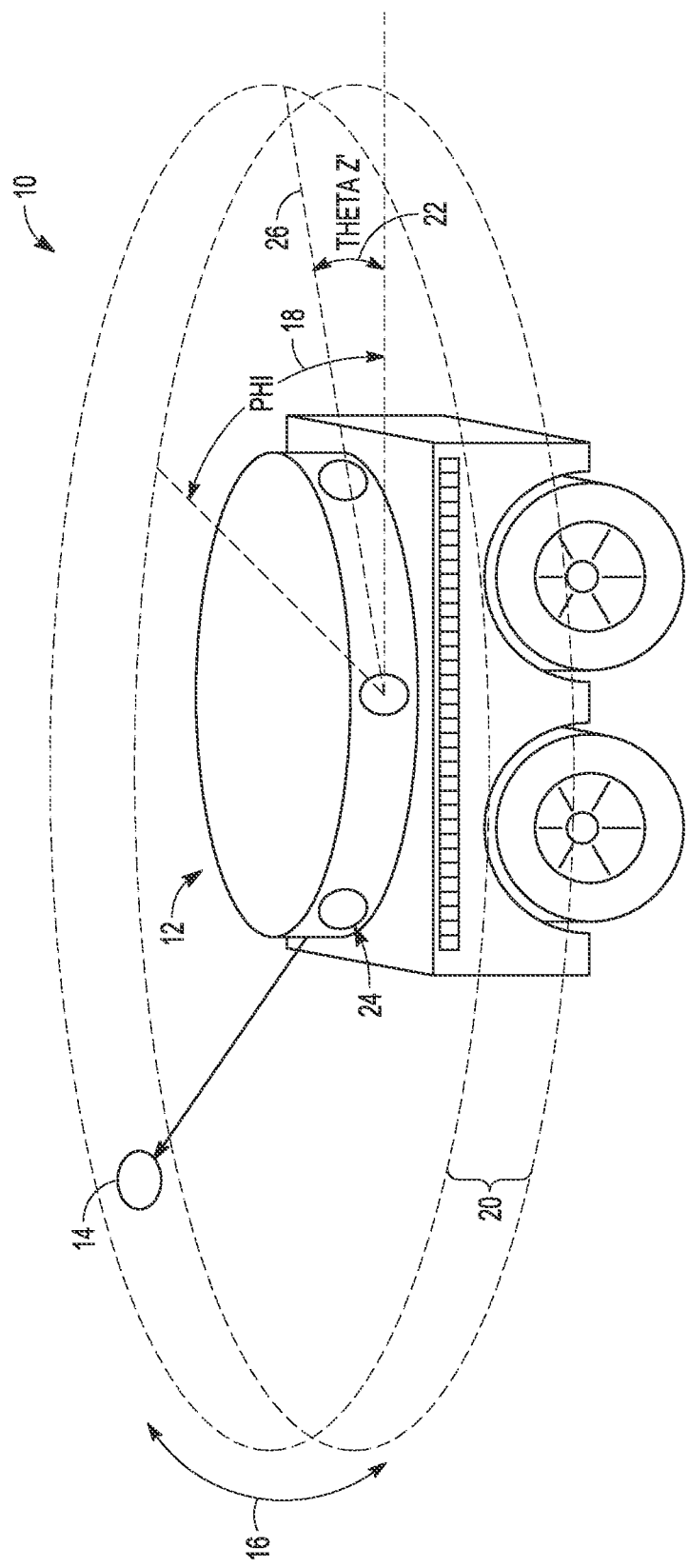
FIG. 1 is a diagram of a steerable laser transmitter and situational awareness sensor of the present invention.

Referring now to FIG. 1, in an embodiment an unmanned ground vehicle (UGV) 10 is outfitted with a steerable laser transmitter or active situational awareness sensor (the "device") 12. The sensor includes a detector, the transmitter does not. Device 12 is capable of scanning a collimated spot-beam 14, single wavelength or multispectral, projected into a narrow FOV (e.g., a few degrees) over a 360° FOR 16 in angle Phi 18 and a defined FOR 20 in angle Theta Z' 22, typically 1 to 6 degrees in each spectral band In a specific configuration, the FORs in angle Phi 18 and Theta Z' 22 correspond to horizontal and vertical FOR, respectively. In other embodiments, device 12 may be configured to scan a reduced FOR. For example, in some applications the sensor may need to only scan a forward 180° FOR.

Device 12 comprises a laser, a MEMS MMA, a fixed mirror, a MMA controller, a computer, various optical components and possibly a detector housed in a structural housing 24. One or more apertures 26 are formed in housing 24 to facilitate scanning spot-beam 14 over the FOR. To scan the 360° FOR 16, the housing may have a single continuous ring aperture or multiple discrete apertures placed every 360/N degrees.

The laser (CW or pulsed) is configured to generate a beam of optical radiation (UV, Visible or IR) at an input wavelength. The fixed mirror includes one or more conic sections oriented along an optical axis in the Z direction. Responsive to command signals, the MEMS MMA re-directs and focuses the beam of optical radiation into the spot-beam 14, which is steered about the optical axis in two dimensions onto the one or more conic sections of the fixed mirror, which redirects the spot-beam 14 to a location Phi and Theta Z' in the FOR. One or more sections of non-linear material (NLM) are positioned in the optical path of the spot-beam to convert the input wavelength of the spot-beam to a different wavelength(s) while preserving the steering of the spot-beam. For example, the NLM may be formed as an annular cylindrical shaped optical element coincident with the optical axis around the conic section of the fixed mirror or it may be formed as reflective optical coatings on the mirrors. The various optical components are configured, at least in part, based on the particular aperture configuration of the sensor to scan the spot-beam 14 over the FOR. A detector can be configured to sense a reflected component of the spot-beam, which can be processed to provide intensity or range.

Figure 8A:
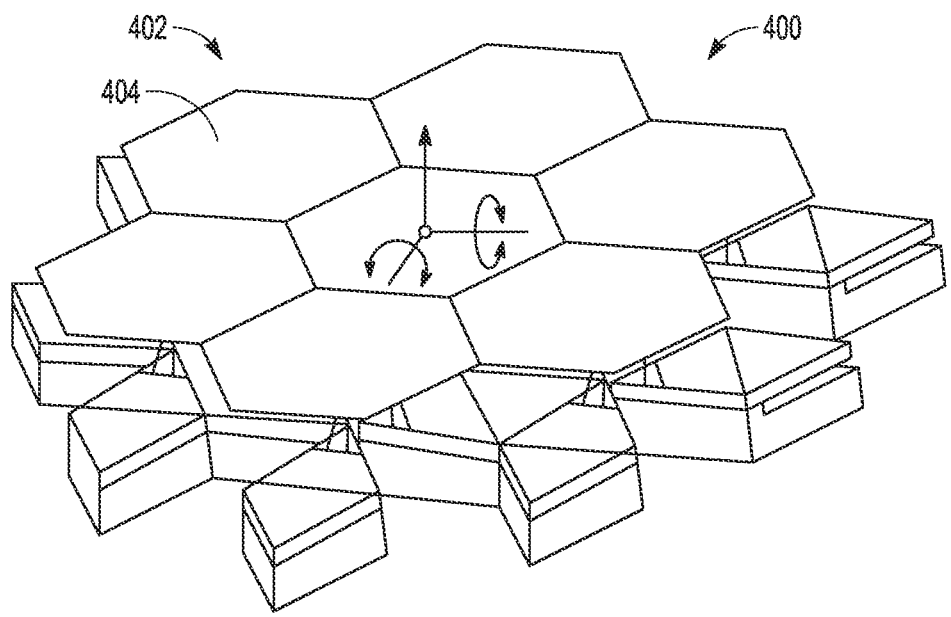
FIGS. 8A-8B are illustrations of a known embodiment of a Tip/Tilt/Piston ("TTP") MEMS MMA and a single mirror actuated to tip, tilt and piston.
Figure 8B:
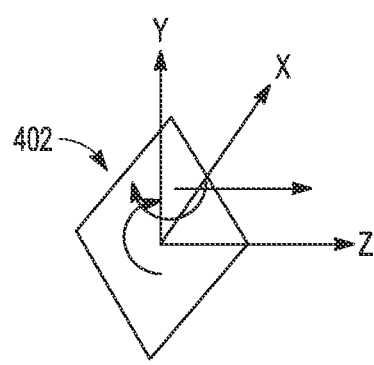

As best shown in FIGS. 8A-8B, a Micro-Electro-Mechanical System (MEMS) Micro-Mirror Array (MMA) 400 comprises a plurality of independently and continuously controllable mirrors 402 to re-direct optical radiation to focus and steer the optical beam(s). Each mirror is capable of at least "Tip" (rotation about an X-axis), "Tilt" (rotation about a Y-axis and "Piston" (translation along a Z-axis, perpendicular to the XY plane) where the X, Y and Z are orthogonal axes in a three-dimensional space. The Piston capability can be used generically speaking to "shape" the beam(s) that are reflected off of the MEMS MMA.

The MEMS MMA can support a diversity of wavelengths of light without changes to the material system or command signals (steering parameters) by proper configuration of reflective coatings 404 applied to the mirrors. The wavelengths may span the UV, Visible and IR bands. In one case, the mirrors may all have a broadband reflective coating in which case the spectral content of the amplified light beam is determined by the spectral output of the laser. In another case, case, the mirrors may all have a narrowband reflective coating at a particular wavelength. Changing this wavelength does not affect either the material system or steering parameters for the MEMS MMA. In yet another case, the mirrors may have narrowband reflective coatings at different wavelengths such that the amplified light beam includes a diversity of wavelengths. In certain embodiments, one or more optical NLM may be incorporated with the reflective coatings to perform the wavelength conversion.

The MEMS MMA can be partitioned into a plurality of segments, each including a plurality of mirrors to form and steer different light beams, adjust the size/power of a given light beam, and to combine multiple laser sources.

With a plurality of mirrors, the piston capability can be used to perform beam shaping functions such as to adjust the focus, collimation, size, divergence or intensity profile of the light beam, produce deviations in the wavefront of the light beam beam to compensate for atmospheric distortions, adjust phase to maintain a zero phase difference across the wavefront of the light beam, or to improve the formation and steering of the light beam by approximating a continuous surface across the micro-mirrors.

The MEMS MMA is preferably capable of tipping and tilting over range of at least −15°×+15° to steer over a range of +/−30°×30° and pistoning (translating) over a range of at least +/−15 microns (at least one-half wavelength in either direction) at a rate of at least 1 KHz (<1 millisecond). Piston is not required for basic steering of the light beam but allows for shaping of the beam. The MEMS MMA must have a sufficient number of mirrors, mirror size/resolution, fill factor, range of motion, response time, response accuracy and uniformity across the array.

Figure 2:
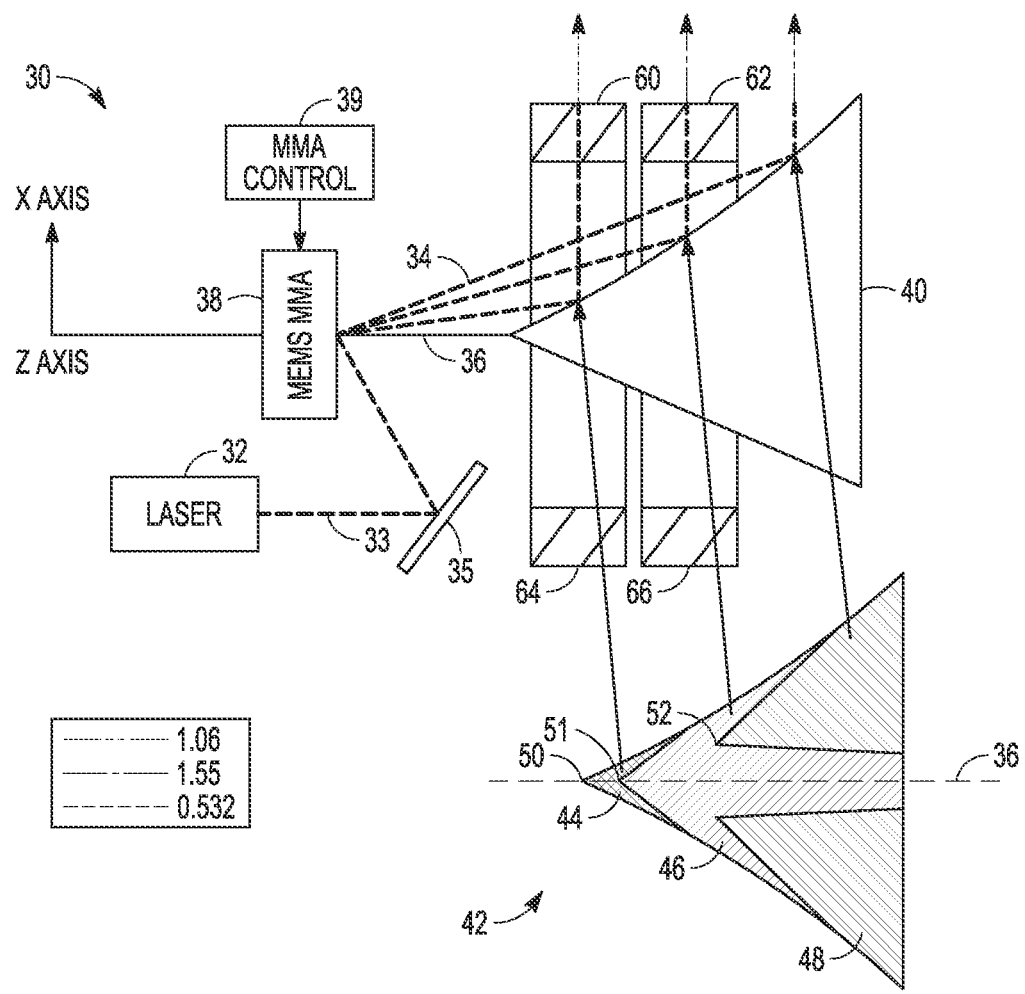
FIG. 2 is side view of an embodiment of a multispectral MEMS MMA steered laser transmitter and detailed side view of the conic sections of the fixed mirror.

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

Referring now to FIG. 2, an embodiment of a laser transmitter 30 comprises a laser 32 configured to generate a beam 33 of optical radiation at an input wavelength. The beam is re-directed off a fold mirror 36 to a MEMS MMA 38 responsive to command signals from a MMA controller 39 to cause the beam to be focused into a spot-beam 34 at the input wavelength and steered in two-dimensions about an optical axis 36. As used herein, a spot-beam is at least collimated to a first order as would be understood by those skilled in the relevant art. Other configurations of fold mirror 36 and MEMS MMA 38 exists and will be described in reference to FIGS. 9A-9B and 10A-10C below to focus the beam into a spot-beam and steer the spot-beam about the optical axis.

A fixed mirror 40 has a generally conical shape 42 oriented along the optical axis 36 (coincident with or offset from in different configurations) to redirect the spot-beam 34 to a location in the two-dimensional FOR. Steering spot-beam 34 in a circle around the conical shape scans the redirected spot-beam 34 around a 360° FOR (e.g., horizontal). Varying the radius of the circle scans the redirected spot-beam 34 in a defined FOR (e.g., vertical). The angle of the conical shape 42 of fixed mirror 40 may or may not be configured such that the spot-beam 34 is redirected perpendicular to optical axis 36. For simplicity of illustration, the angle of conical shape 42 does redirect spot-beam 34 perpendicular to optical axis 36 in this embodiment.

The fixed mirror 40 has a generally "conical shape" 42, which is defined as "of, relating to, or shaped like a cone." A cone is a three dimensional geometric shape described by a circular base, an axis perpendicular to a circular base, an apex located on the axis, and a surface that is the locus of straight lines from the apex to the perimeter of the circular base (C1). A "normal" cone (CN1) is a cone in which the axis intersects the base in the center of the circle and the surface is rotationally symmetric about the axis.

If the laser transmitter 30 is configured to convert the input wavelength of the spot-beam 34 to a single output wavelength (different than the input wavelength), fixed mirror 40 comprises a single conic section. For example, a 1.06 micron input wavelength could be converted to one of 0.532 (visible—green), 0.355 micron (UV), 1.55 micron (SWIR) or a LWIR between 8-12 microns. If the laser transmitter 30 is configured to convert the input wavelength of the spot-beam 34 to a multispectral output, fixed mirror 40 comprises multiple conic sections of different conical shapes to preserve the steering of each of the spot-beams at the different wavelengths. For example, a 1.06 micron laser may be converted to output the 1.55 micron and 0.532 micron beams and passed to output the 1.06 micron beam. The different spectral beams may be scanned sequentially, time and/or spatially multiplexed or simultaneously.

In this embodiment, laser transmitter 30 is configured to generate 0.532, 1.55 and 1.06 micron spot-beams, either sequentially or multiplexed, from a 1.06 micron source laser 32. Fixed mirror 40 includes three conic sections 44, 46 and 48 having different conic shapes and positioned one after the other along optical axis 36 to define the 2D mirror profile. Each conic shape 44, 46 and 48, as defined by the radius (r) of its circular base and the position of the apex 50, 51 and 52, respectively, along the axis perpendicular to the circular base, is configured to re-direct the spot-beam 34 perpendicular to optical axis 36. Each conic section is rotationally symmetric about optical axis 36. The conic sections may be isometric (normal cones) or non-isometric in which the apex is offset from the axis such that the line segments connecting the apex to the circle are of different lengths. The size of each conic section is a function of the size of the spot-beam and the stability of pointing.

A piecewise linear (PWL) approximation (P1) of a cone (C1 or CN1) is three dimensional geometric shape described by a base that is a polygon with 3 or more sides, an axis perpendicular to the base, an apex located on the axis and a surface that is the locus of straight lines from the apex to perimeter of the base. If the axis is located at the center of the polygon, the geometric shape is rotationally symmetric about the axis.

A cone (C1 or CN1) plus a powered optic (C2) is a three dimensional geometric shape described by a circular base, an axis perpendicular to the base, an apex located on the axis and a surface that is the locus of lines that curve in planes that are parallel to the axis from the apex to perimeter of the base. Because the mirror's surface is curved, the spot size is actually different at different locations on the mirror. This causes some distortions in the far field and extra beam divergence. Using an aspherical surface helps correct this. The effect is reduced with more apertures.

A PWL approximation of a cone (C1 or CN1) plus a powered optic (P2) is a three dimensional geometric shape described by a base that is a polygon with 3 or more sides, an axis perpendicular to the base, an apex located on the axis and a surface that is the locus of lines that curve in planes that are parallel to the axis from the apex to perimeter of the base.

A truncated cone (C3) is a three dimensional geometric shape described by a circular base, an axis perpendicular to the base, a top described by a circle and a surface that is the locus of straight lines parallel to the axis from the perimeter of the top to perimeter of the base.

A truncated PWL approximation of a cone (P3) is a three dimensional geometric shape described by a base that is a polygon with 3 or more sides, an axis perpendicular to the base, a top described by a polygon of 3 or more sides and a surface that is the locus of straight lines from the perimeter of the top to perimeter of the base.

A truncated cone plus a powered optic (C4) is a three dimensional geometric shape described by a circular base, an axis perpendicular to the base that intersects the base in the center of the circle, a top described by a circle and a surface that is the locus of lines that curve in planes that are parallel to the axis from the perimeter of the top to perimeter of the base.

A truncated PWL approximation of a cone plus a powered optic (P4) is a three dimensional geometric shape described by a base that is a polygon with 3 or more sides, an axis perpendicular to the base, a top described by a polygon of 3 or more sides and a surface that is the locus of lines that curve in planes that are parallel to the axis from the perimeter of the top to perimeter of the base.

Any of the above conical shapes can be combined to create an acceptable conical shape for each of the conic sections of the fixed mirror (i.e. a polygon base with a curved surface formed by the locus of curved lines from the apex to the perimeter of the polygon base). Any of the above conical shapes may be combined with focusing optic L1.

Any of the above conical shapes are subject to manufacturing tolerances of the fixed mirror. A conical shape, such as a normal cone, that is designed to be rotationally symmetric about the axis may deviate from such symmetry within the manufacturing tolerances. Alternately, a conical shape may be designed with the axis intentionally offset from the center of the base (circle or polygon) in order to scan a particular FOR. Another alternative is to use the MEMS MMA to vary Theta Z as a function of Phi in order to scan a particular FOR with any conical shape.

In this embodiment, to convert the input wavelength of 1.06 micron to a multispectral output of 1.06, 1.55 and 0.532 micron, first and second annular cylindrically shaped optical elements 60 and 62 with optical non-linear material 64, 66, respectively, selected to convert 1.06 micron to 0.532 micron and 1.06 micron to 1.55 micron, respectively, are oriented along and coincident with optical axis 36 around conic sections 44 and 46, respectively, of fixed mirror 40. No NLM is positioned adjacent conic section 48, which is simply redirecting the 1.06 micron wavelength of spot-beam 34. The MEMS MMA steers the spot-beam at the input wavelength to the appropriate conic section and around the conic section to scan a two-dimensional FOR at the desired output wavelength. Each optical element includes mirrors formed on both the inner and outer diameter of the ring. Both mirrors are partially transmissive to allow light to enter the NLM, perform the wavelength conversion and exit the NLM.

Nonlinear optics (NLO) is a branch of optics that describes behavior of light in nonlinear media, that is, media in which the dielectric polarization P responds nonlinearly to the electric field E of the light. Nonlinear optics explains nonlinear response of properties such as frequency (wavelength). Nonlinear materials are used in frequency mixing processes such as Second Harmonic Generation (SHG), or frequency doubling, generation of light with a doubled frequency (half the wavelength), two photons are destroyed creating a single photon at two times the frequency. Third Harmonic Generation (THG), generation of light with a tripled frequency (one-third the wavelength), three photons are destroyed creating a single photon at three times the frequency. Optical parametric oscillation (OPO), generation of a signal and idler wave using a parametric amplifier in a resonator (with no signal input). OPO uses an active gain media that requires pumping. The same principles as reflected in SHG, THG or OPO are used to select the nonlinear materials to convert from a known input wavelength to a specified output wavelength.

Figure 3A:
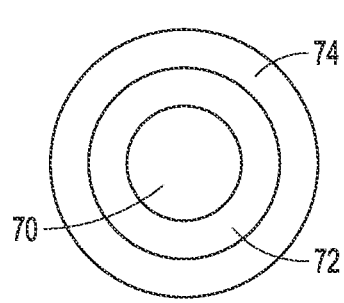
FIGS. 3A, 3B, 3C illustrate sequential wavelength, time multiplexed and time/spatial multiplexed multispectral steered spot-beams.
Figure 3B:
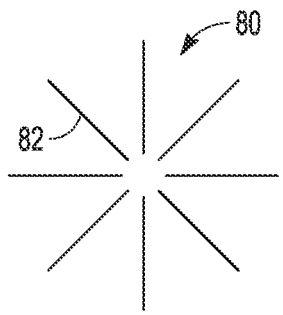

Referring now to FIGS. 3A-3B, a multispectral scan of the two-dimensional FOR can be generated by steering the spot-beam onto the different conic sections of the fixed mirror in multiple ways. The spot-beam is sized and steered to address only one conic section, one output wavelength, at a time. These techniques can be used separately or combined and may be adapted dynamically based on various system level inputs.

A "sequential wavelength" technique scans the FOR with a $1^{st}$ wavelength then a $2^{nd}$ wavelength and then a $3^{rd}$ wavelength. As shown in FIG. 3A, the spot-beam is scanned in a first circle 70 at a radius selected to intersect the first conic section to scan the $1^{st}$ wavelength, a second circle 72 at a larger radius selected to intersect the second conic section to scan the $2^{nd}$ wavelength, and a third circle 74 at a largest radius selected to intersect the third conic section to scan the $2^{nd}$ wavelength. This may be repeated to continuously scan the entire 2D FOR for each wavelength sequentially or in an arbitrary order.

A "time multiplexed wavelength" technique scans each of the $1^{st}$, $2^{nd}$ and $3^{rd}$ wavelengths at the given position in the FOR and repeats to scan the entire FOR. As shown in FIG. 3B, the spot-beam scans a first line 80 along each of the three conic sections of the fixed mirror at a location on the mirror corresponding to a desired position in the 2DR. The spot-beam is steered around the conic shape to a different location and scans a second line 82 along each of the three conic sections corresponding to a different position in the 2D FOR. This is repeated at multiple locations completing a circle around the conic shape of the fixed mirror to scan the entire 2D FOR. This might trace a scan in a 2D FOR of 0.532 0°, 1.55 0°, 1.06 0°, 0.532 2°, 1.55 2°, 1.06 2° and so forth.

Figure 3C:
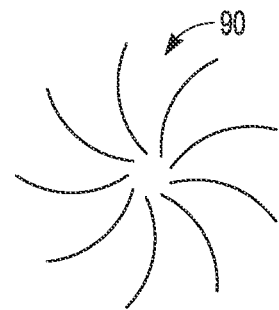

A "time and spatially multiplexed wavelength" technique scans each of the $1^{st}$, $2^{nd}$ and $3^{rd}$ wavelengths at different positions in the FOR. As shown in FIG. 3C, the spot-beam is scanned in a spiral pattern 90. This is similar to the scan lines of the time-multiplexed technique except that instead of holding the location on the mirror constant the location around the conic section (position in the FOR) is indexed as well. This might trace a scan in a 2D FOR of 0.532 0°, 1.55 2°, 1.06 4°, 0.532 6°, 1.55 8°, 1.06 10° and so forth. Assuming equal scan rates, this approach can cover the same FOR in one-third the time as the time multiplexed technique.

Figure 4A:
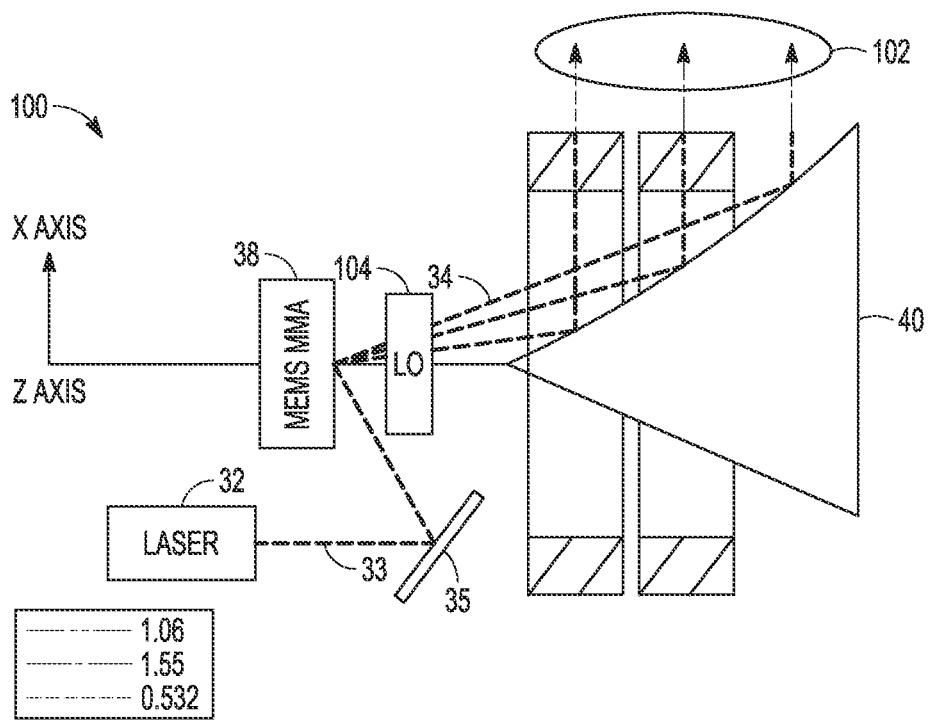

Referring now to FIGS. 4A-4D, an embodiment of a laser transmitter 100 is configured to simultaneously scan a multispectral spot-beam 102 over a 2D FOR. For purposes of brevity, reference will be made to the core elements of the laser transmitter as shown in FIG. 2, which are configured in a like manner. To produce multispectral spot-beam 102, an L0 optic 104 is inserted between MEMS MMA 38 and fixed mirror 40 to shape the spot-beam 34 to have an oblong shape whose major axis is oriented along optical axis 36 and whose minor axis is perpendicular to optical axis 36 so that the spot-beam covers a plurality (e.g., all) of the difference conic sections 44, 46 and 48 simultaneously. Spot-beam 34 is simultaneously redirected through the NLM of optical elements 60 and 62 and free space adjacent conic section 48 to produce a 0.55 micron, 1.55 micron and 1.06 micron to produce multispectral spot-beam 102. As shown in FIGS. 4b and 4c, L0 optic 104 is a circular/cylindrical optic 106 that shapes the incoming spot into a line (the oblong spot) along the optical axis. L0 is a cylindrical lens that is rotationally symmetric about the optical axis. A simple circular scan by the MEMS MMA of the oblong beam around fixed mirror 40 produces a single multispectral beam-spot that scans the entire 2D FOR. Alternately, the MEMS MMA, and particularly the piston capability, may be used to shape spot-beam 102 in addition to or instead of L0 optic 104.

Figure 5:
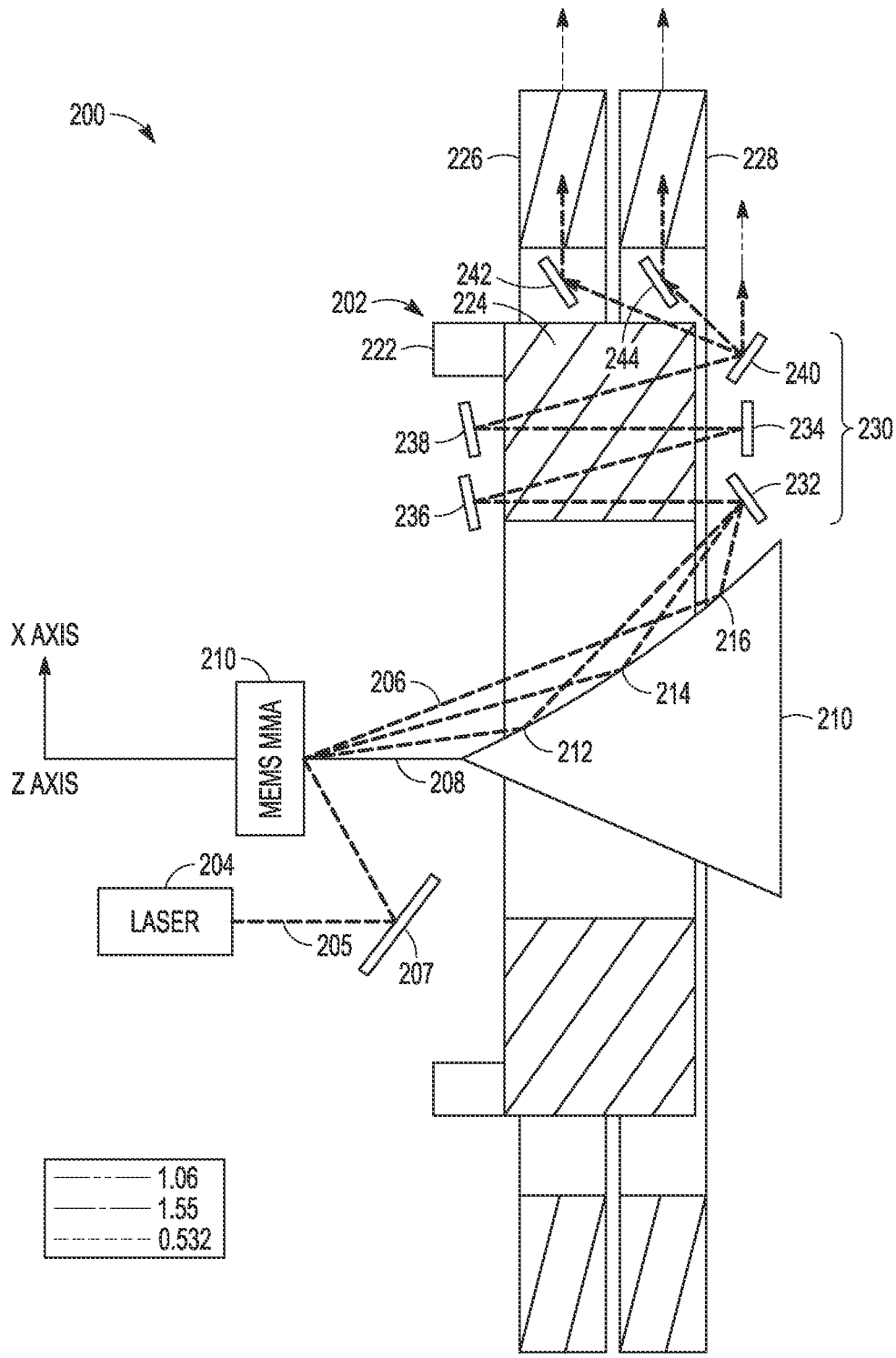
FIG. 5 is a side view of an embodiment of a multispectral MEMS MMA steered laser transmitter with an optical ring amplifier.
Figure 6:
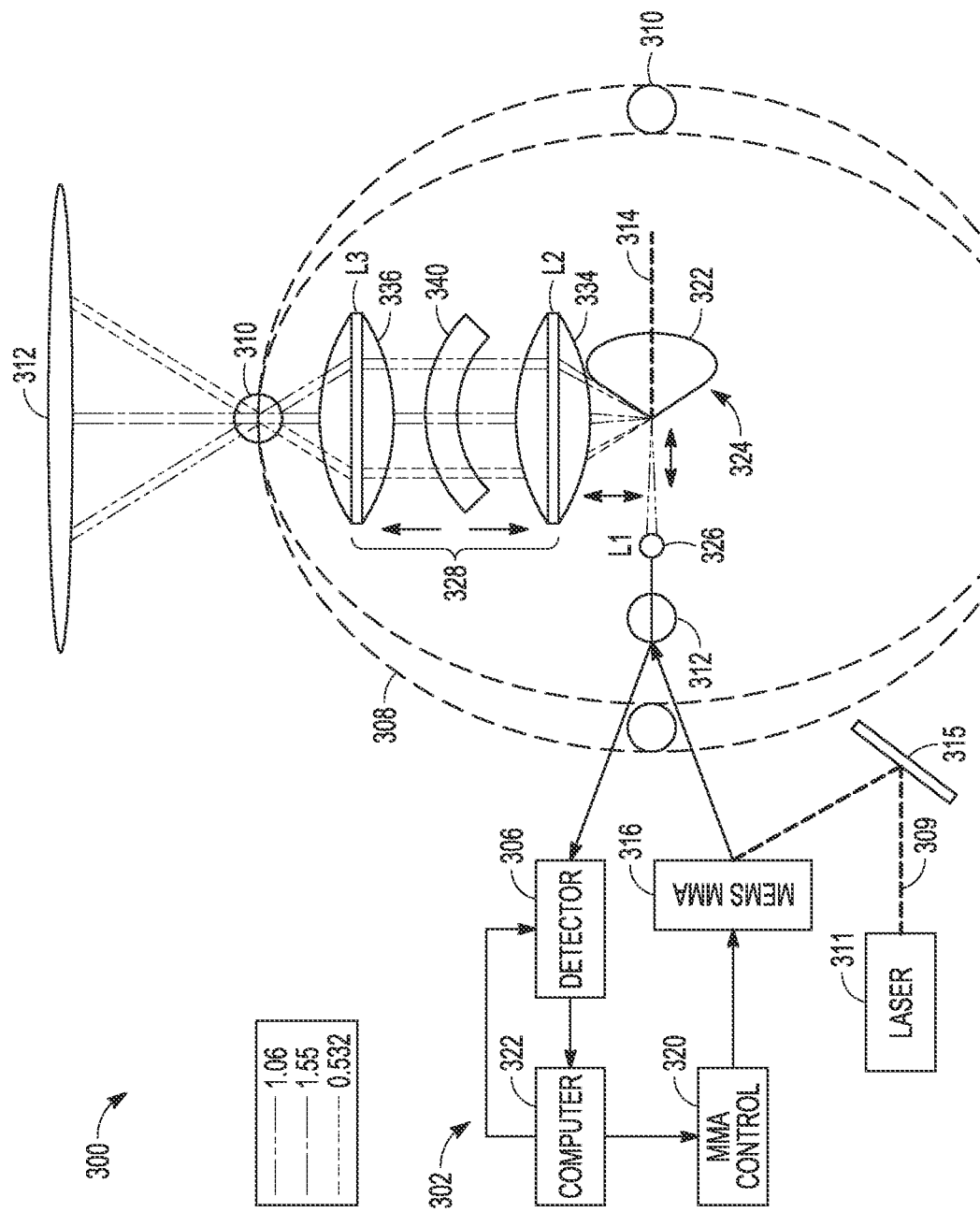
FIG. 6 illustrates an embodiment of a MEMS MMA steered situational awareness sensor including optics L1, L2 and L3 for converting the wavelength of the spot-beam and scanning the redirected spot-beam through discrete apertures.
Figure 7A:
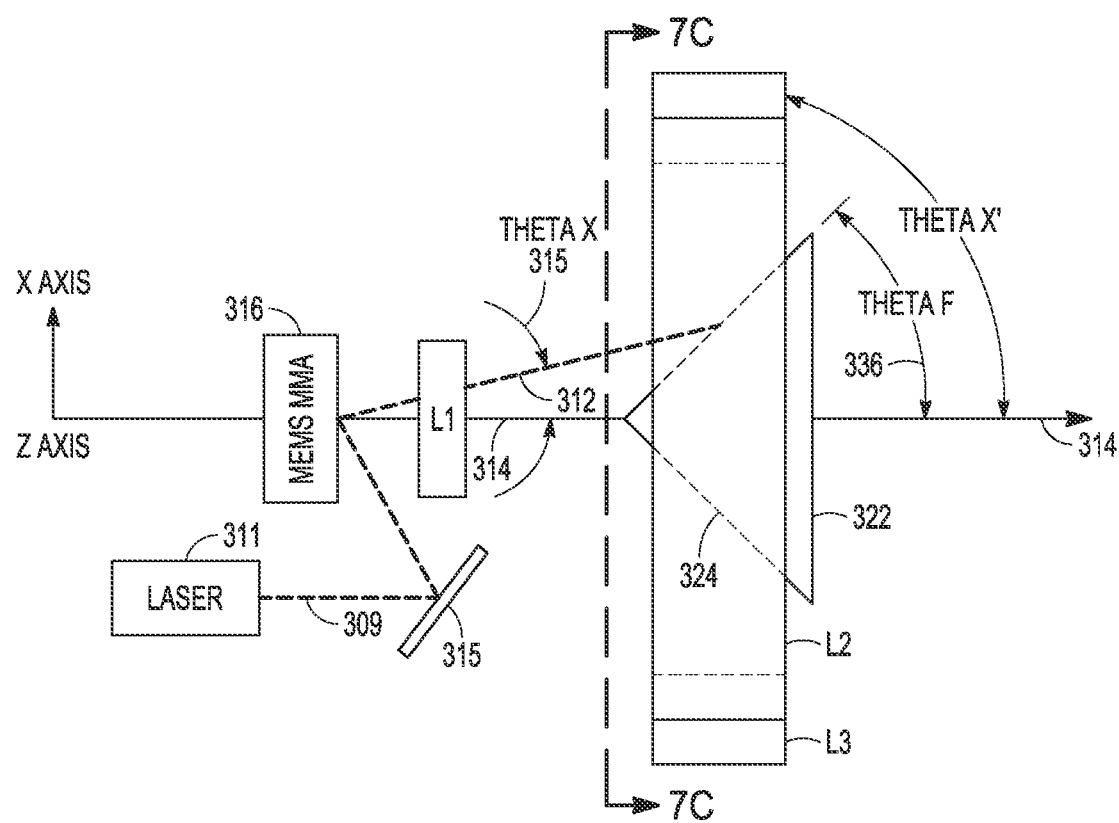
FIGS. 7A-D are top, side, section A-A and section B-B views of the situational awareness sensor of FIG. 6.
Figure 7B:
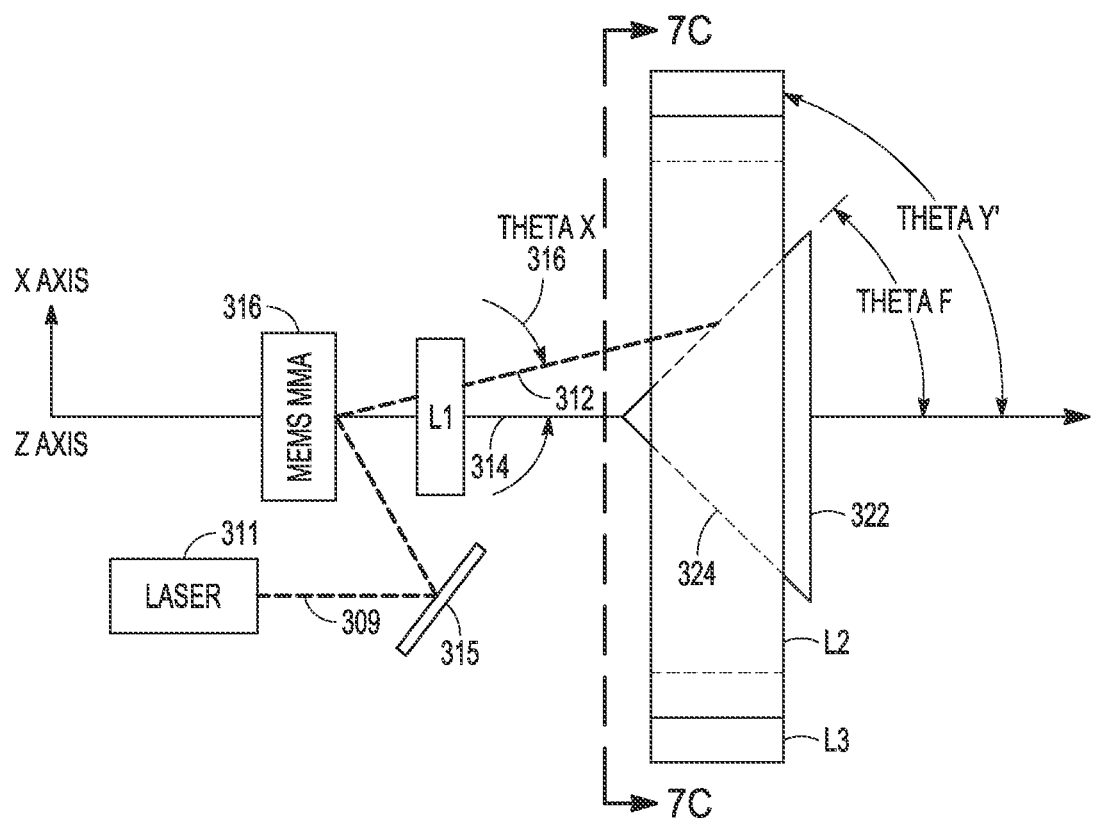
Figure 7C:
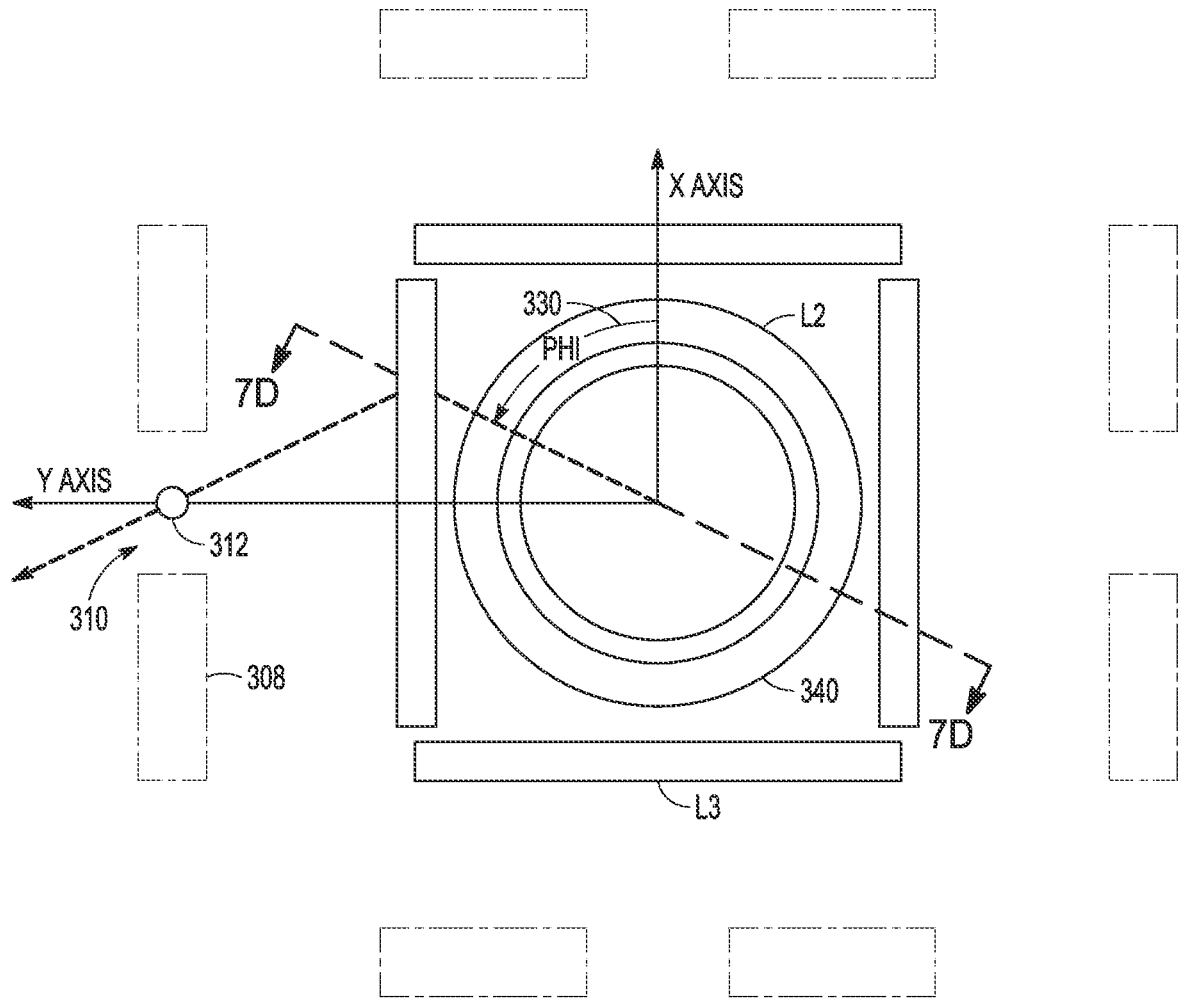
Figure 7D:
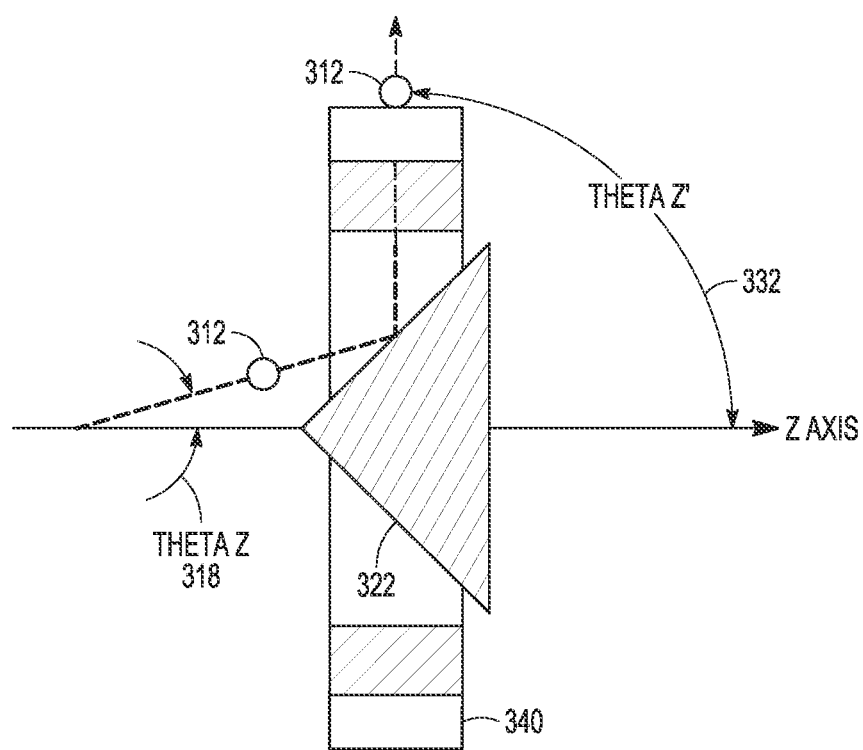

Referring now to FIG. 5, an embodiment of a multispectral extended range laser transmitter 200 integrates a ring amplifier 202 with a multispectral laser transmitter. As shown, the spot-beam is amplified prior to wavelength conversion. Typical amplifier gain medium may change the wavelength slightly. Thus it is preferred to amplify prior to wavelength conversion. This also reduces the need for different gain mediums for each of the converted wavelengths, further reducing the SWaP.

A laser 204 is configured to generate a beam 20S at an input wavelength. A fold-mirror 207 re-directs the beam to a MEMS MMA 210 responsive to command signals to focus the beam into a spot-beam 206 at the input wavelength and steer the spot-beam in two-dimensions about an optical axis 208. A fixed mirror 210 comprising different conic sections 212, 214 and 216 is oriented along the optical axis 208 to redirect the spot-beam 206 to a location in the two-dimensional FOR.

Ring amplifier 202 comprises one or more pumps 222 configured to pump a ring-shaped gain medium 224 is placed around the optical axis 208 between the conic sections of fixed mirror 210 and green and blue annular sections of NLM 226 and 228. A system of mirrors 230 positioned fore and aft of the gain medium 224 is configured to redirect the spot-beam 206 to pass through the gain medium one or more times to amplify the spot beams while preserving the steering of the spot-beam over the FOR. Gratings may be used to form the mirrors.

In an embodiment, a single system of mirrors is used to redirect the spot-beam through the gain medium for all of the wavelengths. A single entrance mirror and a single exit mirror redirect the spot-beam from different locations on the fixed mirror (different conic sections) to enter the sidewall of the gain medium at different angles. This could result in losses or at least unequal amplification between the wavelengths. It may be desirable to power one or more of the sidewall mirrors or add mirrors to avoid beam walk-off.

For this embodiment, an entrance mirror 232 intercepts the spot-beam from each of the three conic sections and redirects the spot-beam parallel to optical axis 208 through a first sidewall 234 of the gain medium. A plurality of mirrors 236 are configured to redirect the spot-beam to pass back-and-forth through the gain medium between the second and first sidewalk 238, 234 multiple times to amplify the spot-beam before exiting the first sidewall parallel to the optical axis. An exit mirror 240 is configured to redirect the amplified spot-beam to a mirror 242 that redirects the spot perpendicular to the optical axis to pass through the green NLM 226, to a mirror 244 that redirects the spot perpendicular to the optical axis to pass through the blue NLM 228 and to redirect the spot perpendicular to the optical axis to directly output the red spot-beam. The light entering the amplifier will have slightly decreased efficiency since the interfaces are non-normal to the sidewalls.

In another embodiment, the system of mirrors has an entrance and exit mirror for each wavelength that redirects the spot-beams substantially normal to the sidewalk to avoid losses and provide a more uniform amplification. This requires additional mirrors.

In an embodiment in which a single NLM section is used to convert the input wavelength to a different output wavelength, the ring amplifier may be positioned inside the NLM section to amplify the spot prior to wavelength conversion or outside the NLM section to convert the wavelength prior to amplification.

Referring now to FIGS. 6 and 7A-7D, an embodiment of a situational awareness sensor 300 includes a laser transmitter 302 steerable about a 360° horizontal FOR, a wavelength converter 304 and a detector 306 responsive to the converted output wavelength. The sensor is illustrated as a single wavelength sensor for simplicity. The principles apply equally to a multispectral sensor.

Sensor 300 includes a housing 308 having four discrete apertures 310 formed about its circumference at 90° (360°/4) intervals. More generally, the number of apertures and spacing is dictated by the application. The housing comprises a structural member configured to provide support primarily in the direction parallel to the sensor axis.

A laser 311 is configured to generate a beam 309 at an input wavelength (e.g. 1.06 micron). A fold mirror 315 re-directs the beam to a MEMS MMA 316 responsive to command signals to focus the beam into a spot-beam 312 and steer the spot-beam about an optical axis 314 oriented in the Z direction to a location Theta X 315 and Theta Y 317 from the optical axis where Theta X is the angle between the projection of the instantaneous location of the axis of the spot-beam on the X-Z plane and the Z-axis and Theta Y is the angle between the instantaneous location of the axis of the spot-beam on the Y-Z plane and the Z-axis. Theta Z 318 is the angle between the projection of the instantaneous location of the axis of the steered spot-beam and the Z-axis. Because of the rotational symmetry, the position of the X axis is, more or less, arbitrary. In this description, X is parallel to the "in plane" steering direction of the waveguide and Y is parallel to the "out of plane" steering direction of the waveguide. Making X parallel to the in plane steering direction of the waveguide simplifies the description, but it does not have to be in this location, there is a straightforward transform to relate any choice of X to the in plane steering direction.

A MMA controller 320 is configured to issue command signals to the MEMS MMA 316 to steer the spot-beam 312 to the desired Theta X and Theta. Y. A computer 322 is configured to issue signals to the MMA controller 320 that provide the desired Theta X and Theta Y to implement a continuous scan, illumination of multiple discrete objects, variable dwell time, compensation for an external signal etc.

A fixed mirror 322 has a conical shape 324 that is oriented along the optical axis 314 (coincident with or offset from in different configurations) to redirect the spot-beam 312. In this particular configuration, conical shape 324 is a normal cone (CN1) that is rotationally symmetric about its axis, which is coincident with the optical axis 314. The tip of the cone is positioned towards the MEMS MMA with the radius of the cone increasing along the axis away from the MEMS MMA. In a multispectral application with multiple conic sections, each conic section is typically non-isometric to preserve the steering of the spot-beam.

An optic L1 326 is configured to focus the spot-beam 312 onto the conical shape of the fixed mirror, which in turn redirects the spot-beam 312. Optic L1 is suitably configured so that its focal point is at the conical shape of the fixed mirror. This creates the minimum spot size on the conical surface. Since the round beam is actually being projected onto a curved surface, there is distortion of the beam due to the mirror's surface. Keeping the spot small makes the spot project on a "localized flat" surface. Optic L1 could be integrated into conical shape 324. Alternately, the MEMS MMA, and particularly the piston capability, may be used to focus spot-beam 102 in addition to or instead of L1 optic 326.

Four optical channels 328 are positioned between fixed mirror 322 and a different one of the apertures 310 in the housing 308 to guide the redirected spot-beam 312 through the corresponding aperture 310 to a location Phi 330 and Theta Z' 332 where Phi is the angle between the projection of the instantaneous location of the axis of the redirected spot-beam on the X-Y plane and the X axis and Theta Z' is the angle between the projection of the instantaneous location of the axis of redirected spot-beam on the Z axis. Theta Z' 332 is greater than Theta Z 318. The redirected spot-beam 312 scans a FOR defined by the values of Phi and Theta Z'. Theta X' is the angle between the projection of the instantaneous location of the axis of the redirected spot-beam on the X-Y plane and the Z-axis and Theta Y' is the angle between the instantaneous location of the axis of the redirected and the Z-axis.

Each optical channel 328 comprises an optic L2 334 and an optic L3 335. Optic L2 is of larger diameter to collect light coming off the mirror at +/−45 degrees (nominally). A smaller optic is achieved using more and smaller apertures. Optic L2 is placed at approximately its focal length from the mirror to collimate the light. Optic L3 is a fast (low F/#, short focal length) lens that quickly causes the light to cross and diverge out of the aperture.

Steering spot-beam 312 in a circle (constant Theta Z) around the conical shape scans the redirected spot-beam 312 from one aperture 310 to the next around a 360° FOR in Phi. Varying the radius of the circle scans the redirected spot-beam 312 in a defined FOR in Theta Z'. The angle Theta F 336 of the conical shape 324 of fixed mirror 312 may or may not be configured such that the spot-beam 312 is redirected perpendicular to optical axis 314. When Theta F produces a Theta Z' perpendicular to the Z-axis, the situational awareness sensor has a two-dimensional band of coverage comprised of Phi and Theta Z' that is centered on the Z-axis along with the fixed mirror 46. Increasing or decreasing Theta F increases or decreases the nominal Theta Z', respectively. This shifts the two-dimensional band of coverage comprised of and Theta Z' along the Z axis.

Each optical channel 328 further comprises a segment 340 of NLM, which together form a discrete annular ring about fixed mirror 322. The segment 340 of NLM converts the input wavelength of spot-beam 312 to a different output wavelength.

Detector 306 is configured to sense a reflected component of the spot-beam at the output wavelength. The reflected component may be processed to provide an intensity of the illuminated object or a range to the illuminated object.

As previously described, the optical system including the fold mirror and MEMS MMA may have many different configurations to focus optical radiation into a spot-beam and to steer the spot-beam around the optical axis of conically shaped fixed mirror.

Figure 9A:
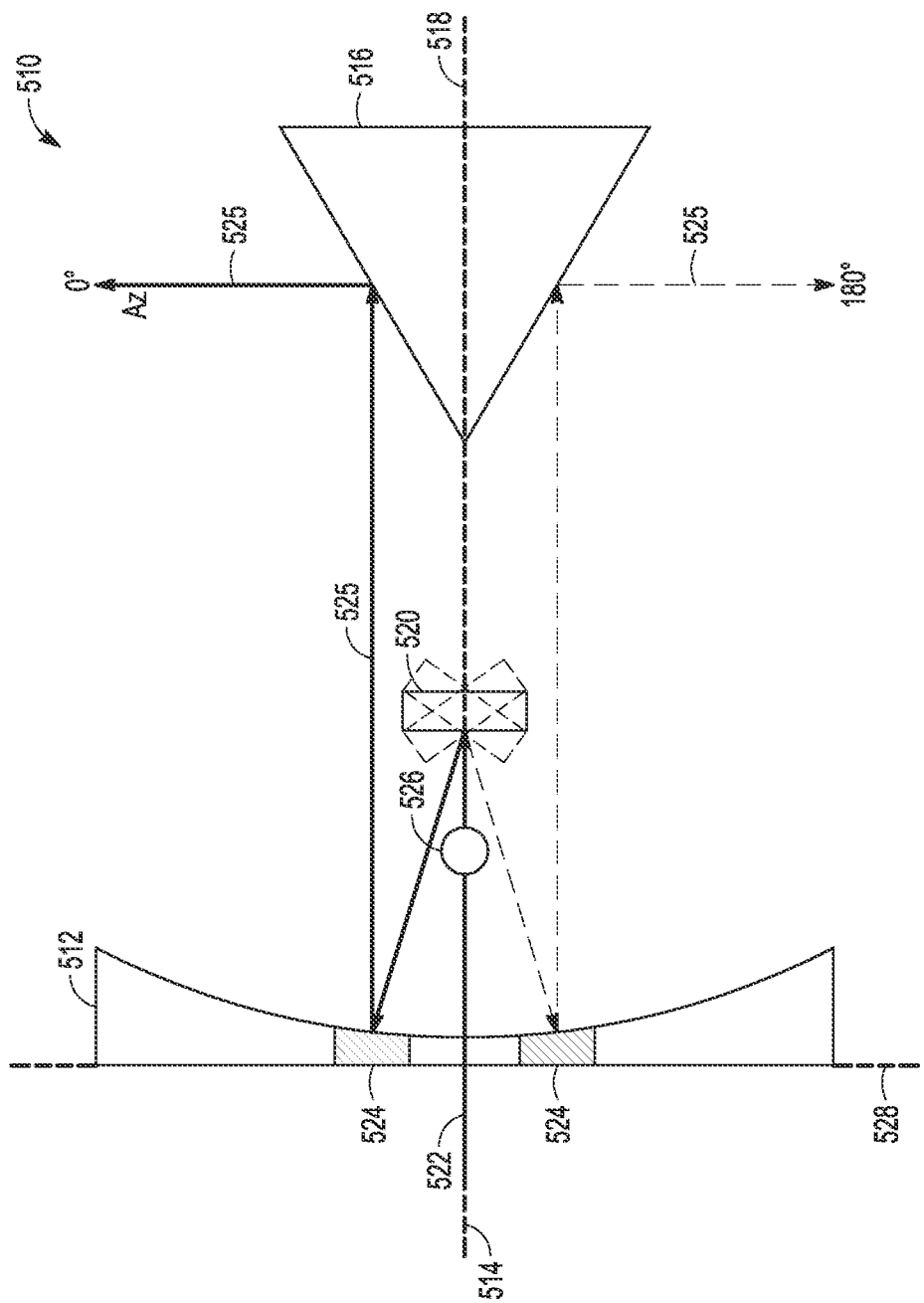
FIGS. 9A-9B are illustrations in which the MEMS MMA steers the beam to different OAP sections of a parabolic mirror to re-direct and focus the beam into a spot-beam on the conical shape of the fixed mirror.
Figure 9B:
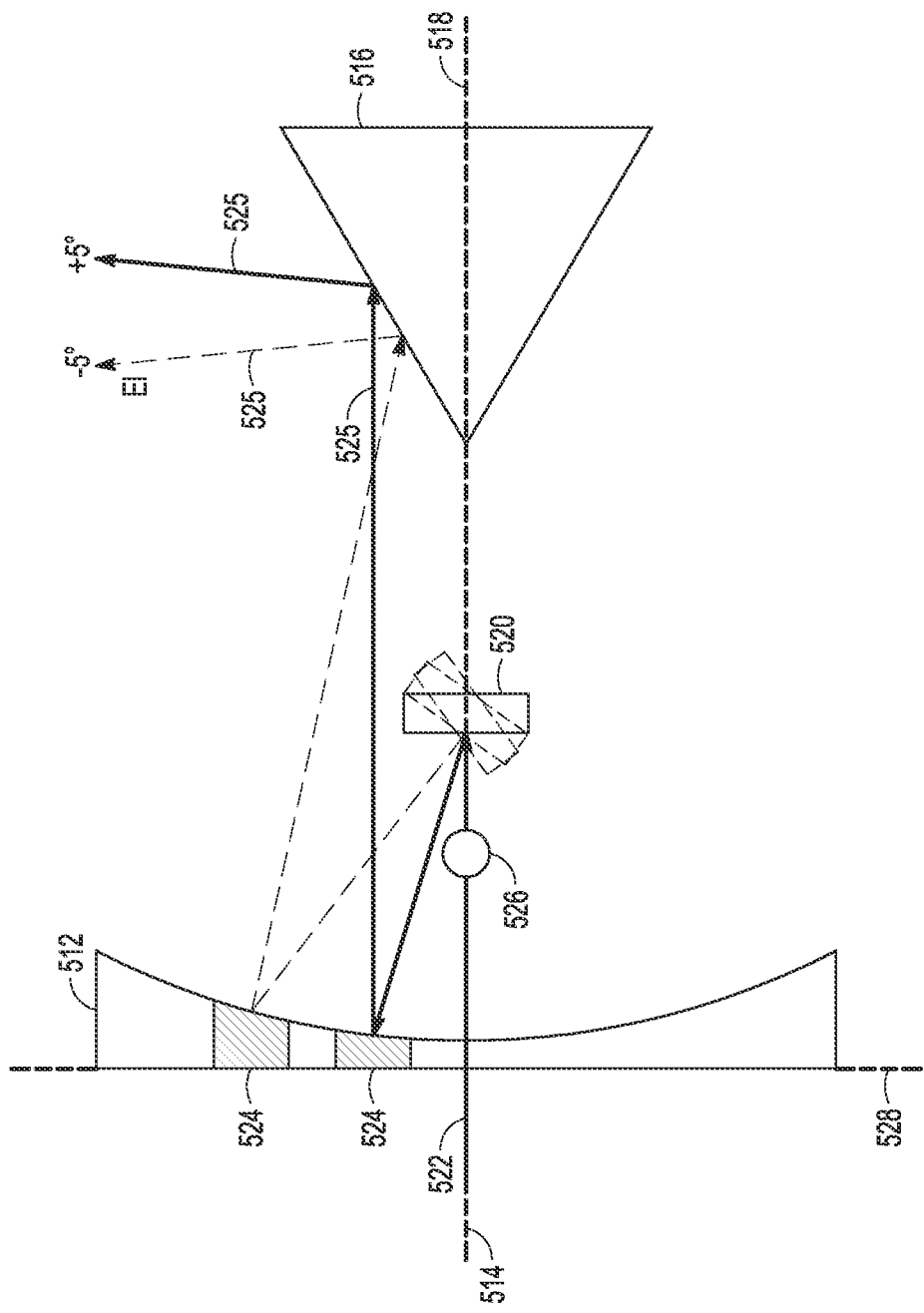

Referring now to FIGS. 9A and 9B, which depict an on-axis embodiment of a beam steerer 510 in Azimuth (Az) and Elevation (EL), the beam steerer includes a parabolic mirror 512 having a hole former at its center on an axis of symmetry 514, a fixed mirror 516 having a conic shape whose optical axis 518 is coincident with the parabolic mirror's axis of symmetry 514, and a MEMS MMA 520 positioned between parabolic mirror 512 and fixed mirror 518 on and nominally perpendicular to the axis. For packaging reasons, e.g., to circumvent structure and electronics, a fold mirror(s) may be placed between parabolic mirror 512 and fixed mirror 518. A beam 522 of optical radiation passes through the hole in parabolic mirror 512 to MEMS MMA 520. Responsive to command signals, the MEMS MMA tips and tilts its mirrors to re-direct beam 522 to a particular off-axis section or OAP 524 of parabolic mirror 512, which re-directs and focuses beam 522 into a spot beam 525 onto a specified location on the conic shape of fixed mirror 516, which in turn re-directs spot-beam 525 to a specific location in the FOR. The MEMS MMA may piston the mirrors to provide a small amount of focusing or may tip, tilt and piston the mirrors to add curvature (optical power) to the MMA to provide a larger amount of focusing to supplement the focusing provided by the off-axis section of the parabolic mirror. The MEMS MMA may also piston the mirrors to shape the wavefront of the spot-beam.

A parabola is defined as a set of points that form a curve where any point on the curve is at an equal distance from a fixed point, the "focus" 426, and a straight line, the "directrix" 528. The focus 526 lies on the axis of symmetry 514 perpendicular to the directrix 528. The optical axis 518 of fixed mirror 516 is oriented perpendicular to directrix 528.

The focus 526 and the specific OAP 524 of the parabola are selected to re-direct and focus optical radiation into a spot at a specified location on the conical shape of fixed mirror 516. In an embodiment, the optical source is nominally positioned 2 focal lengths away from the OAP 524. Fixed mirror 516 is placed another 2 focal lengths from the OAP. This forms a 2-f focusing system between the laser and fixed mirror. The OAP relays the laser focus onto the conical shape of the fixed. The angles between the laser and fixed mirror determine the specific OAP used to re-direct light toward the optical axis of the fixed mirror. Other optical configurations and specific OAP designs used to focus light into a small spot on the conical shape of the fixed mirror are within the scope of the present invention.

Figure 10A:
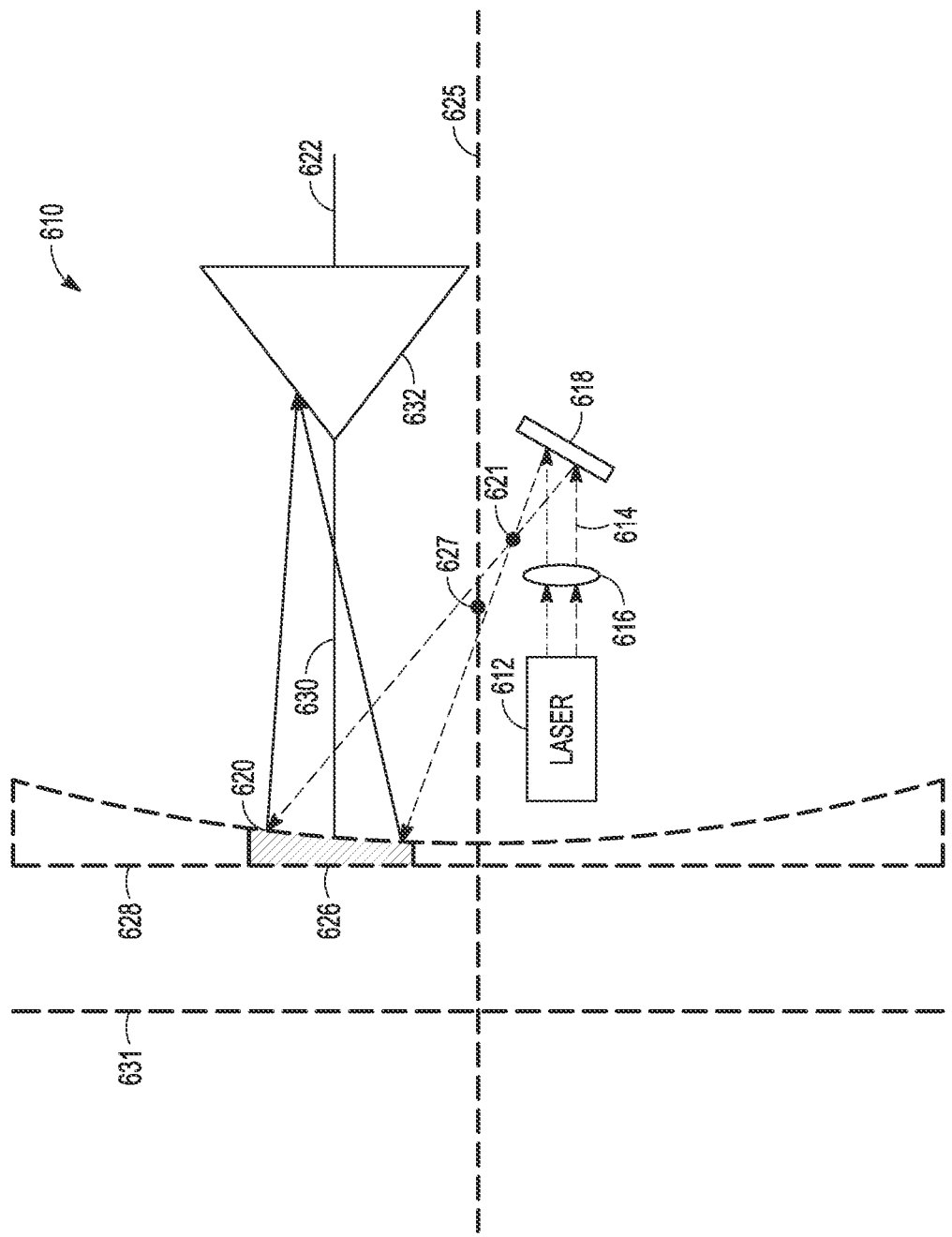
FIGS. 10A-10C are illustrations in which the mirrors of the MEMS MMA approximate an off-axis section of a parabolic surface to re-direct and focus the beam into a spot-beam on the conical shape of the fixed mirror.
Figure 10B:
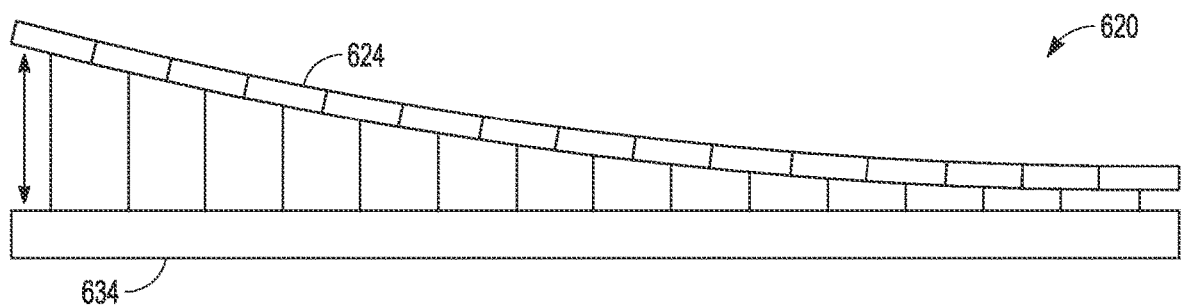
Figure 10C:
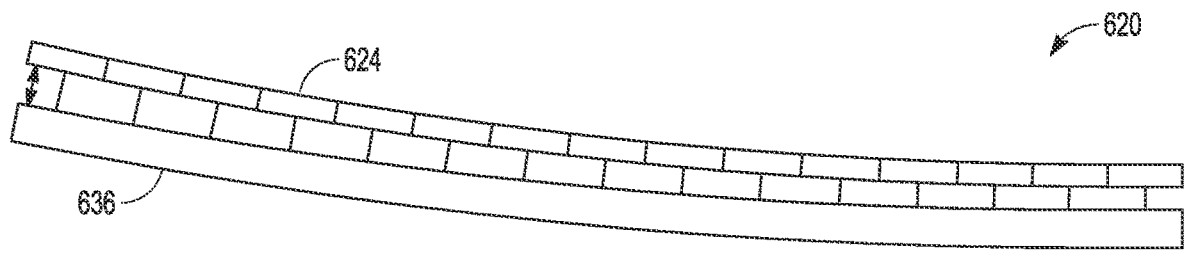

Referring now to FIGS. 10A through 10C, an embodiment of an active situational awareness sensor 610 comprises a laser 612 configured to generate a beam 614 of optical radiation that passes through a lens 616 and is incident on a fold mirror 618. Fold mirror 118 re-directs beam 614 onto a MEMS MMA 620 at an angle of incidence. MEMS MMA 620 is oriented to nominally re-direct optical radiation along an optical axis 622 in the Z direction. In a base or nominal configuration, mirrors 624 provide a curvature that approximates an off-axis section 626 (an "OAP") of a parabolic surface 628. The OAP re-directs and focuses the optical radiation to form a spot-beam 630 on the conical shape of a fixed mirror 632 whose axis is coincident with optical axis 622. The MEMS MMA is responsive to command signals to provide additional focus and to steer spot-beam 630 about the optical axis on the conical surface of the fixed mirror 632. The MEMS MMA may piston the mirrors to provide a small amount of focusing or may tip, tilt and piston the mirrors to add curvature (optical power) to the section of the parabolic surface to provide a larger amount of focusing. The MEMS MMA may also piston the mirrors to shape the wavefront of the spot-beam.

Parabolic surface 628 has a focus 127, and a directrix 631. The focus 627 lies on an axis 625 perpendicular to the directrix 131. The optical axis 622 of fixed mirror 632 is oriented perpendicular to directrix 631. The focus 627 and the specific OAP 626 of the parabola are selected to re-direct and focus optical radiation into a spot at a specified location on the conical shape of fixed mirror 632. In an embodiment, laser 612 is nominally positioned 2 focal lengths away from the OAP 626. Fixed mirror 632 is placed another 2 focal lengths from the OAP. This forms a 2-f focusing system between the laser and fixed mirror. The OAP relays the laser focus 621 onto the conical shape of the fixed. The angles between the laser and fixed mirror determine the specific OAP used to re-direct light toward the optical axis of the fixed mirror. Other optical configurations and specific OAP designs used to focus light into a small spot on the conical shape of the fixed mirror are within the scope of the present invention.

As shown in FIGS. 10B and 10C, the mirrors 624 may approximate the section 626 of the parabolic surface 628 either with a MEMS MMA fabricated on a flat substrate 634 in which the mirrors are tipped, tilted, and pistoned to approximate the section or by fabricating the MEMS MMA on a substrate 636 whose shape approximates the section of the parabola, respectively. The later approach includes either a single curved substrate or multiple flat substrates that form a piecewise linear approximation of the parabolic surface. The later approach being more difficult but preserves the dynamic range of the mirrors in tip, tilt and piston for focusing and steering the spot-beam.

Figure 11A:
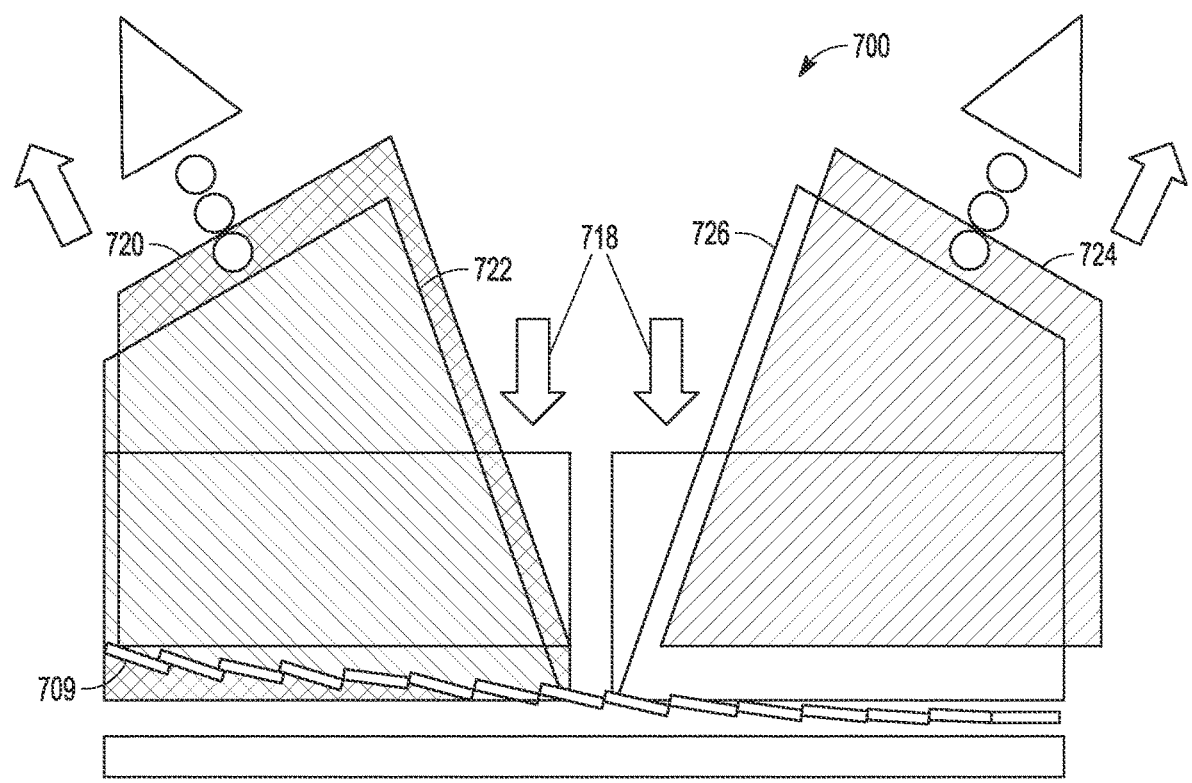
FIGS. 11A through 11C are embodiments in which the MEMS MMA is partitioned into multiple segments to steer multiple spot-beams and in which the mirrors reflect different wavelengths such that the one or more amplified spot beams include multiple different wavelengths.
Figure 11B:
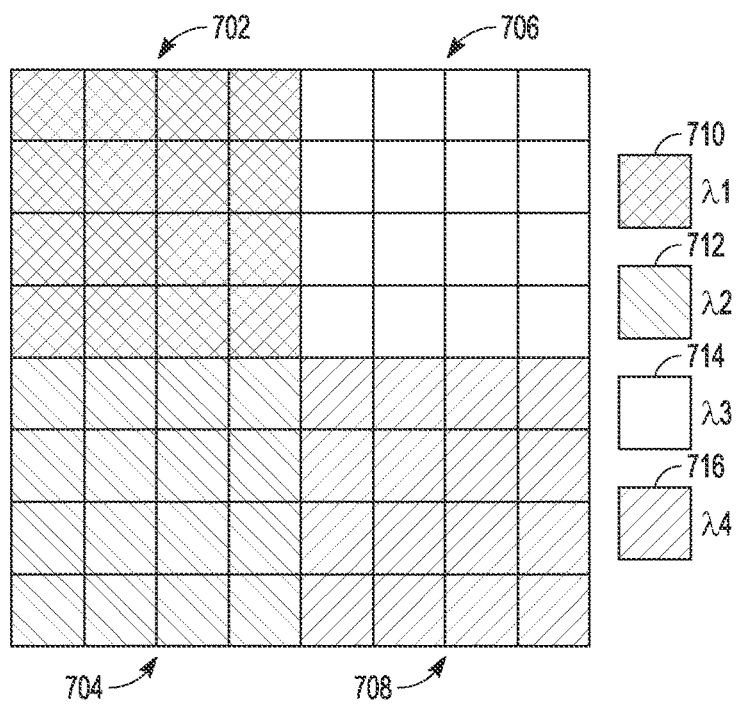
Figure 11C:
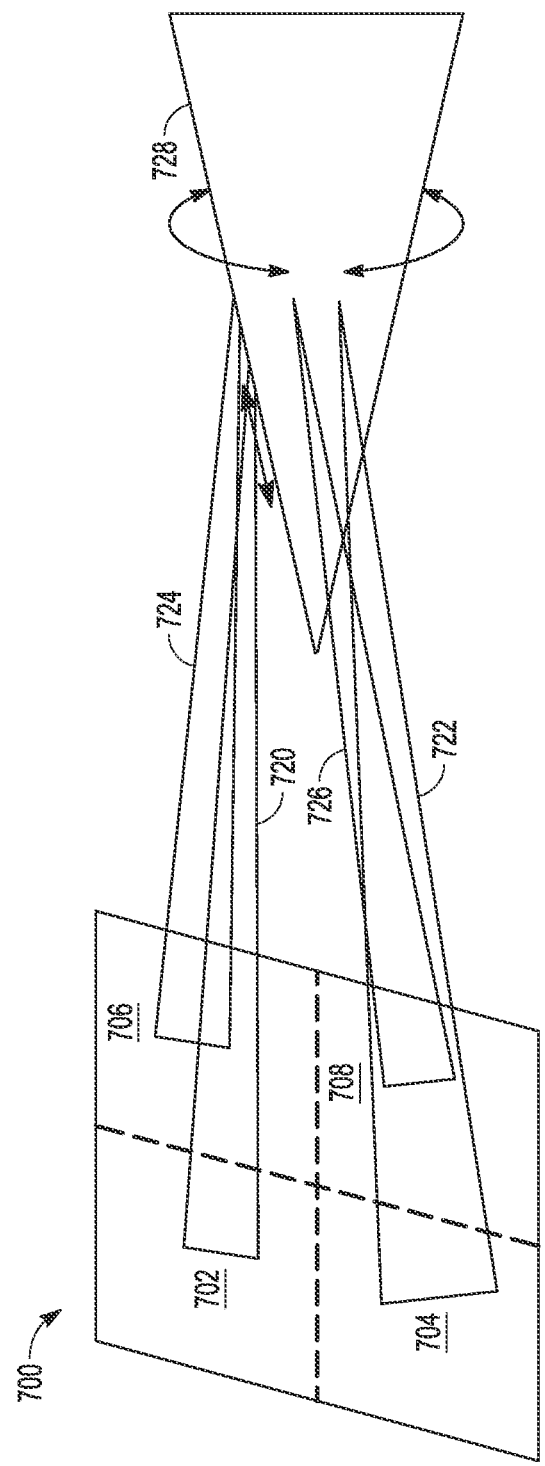

As illustrated in FIGS. 11A-11C, responsive to command signals from the controller, a MEMS MMA 700 is partitioned into four segments 702, 704, 706 and 708 each including a plurality of mirrors 709 illuminated by optical radiation 718. The mirrors in the different sections are provided with reflective coatings 710, 712, 714 and 716 at different wavelengths. The mirrors in 709 approximate different sub-sections of the section of the parabolic surface as previously described. In response to command signals, the MEMS MMA tips/tilts/pistons the mirrors in each segment to independently focus and scan optical beams 720, 722, 724 and 726 over different portions of the conical surface of a fixed mirror 728 to scan different portions of a FOR about the optical axis. One or more sections of optical NLM may be formed as annular optical elements around the fixed mirror 728 or as part of reflective coatings 710, 712, 714 and 716. In an embodiment, one or more beams are used to scan a repetitive pattern in a 360 degree FOR around the optical axis to detect objects and one or more beams are used to scan the locations of the detected objects while the initial 360 degree scan is ongoing. The scans may contain the same or different wavelength compositions. For example, the repetitive scan could be a broad spectral scan and the location specific scans could be narrow spectral scans.

Figure 12:
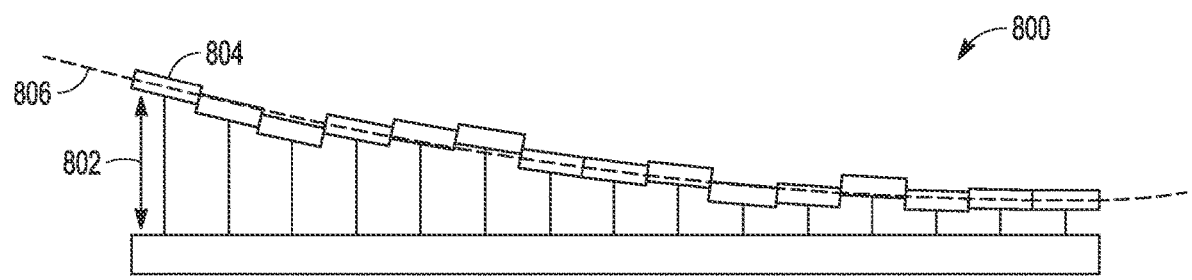
FIG. 12 is an illustration of using the piston capability of the mirrors to shape the spot-beam.

As previously mentioned, the MMA's piston capability can be generally used to "shape" the spot-beam. In addition to focusing and steering the spot-beam, the piston can be used to perform other optical functions on the spot-beam concurrently. As illustrated in FIG. 12, responsive to command signals a MEMS MMA 800 can adjust the piston 802 of mirrors 804 to induce deviations from an off-axis section of a parabolic surface 806. This can be done to compensate for path length variation of the spot-beam (to maintain zero phase across the beam), to correct for atmospheric distortion or both. Adjustments for path length variation can be calibrated offline and stored in a lookup table (LUT) as a function of scan angle. Adjustments for atmospheric distortion are done in real-time during operation of the active imaging system. For wavefront correction, a source emits optical energy in a similar band to illumination e.g., SWIR a beam steerer scans the optical beam onto scene. A wavefront sensor measures the wavefront of the reflected beam to determine the effects of atmospheric distortion. A controller computes the requisite piston adjustments required to correct the wavefront and provides them as command signals to the MEMS MMA. In high quality, high performing active imaging systems, the ability to accurately remove the effects of path length variation and atmospheric distortion is critical to achieving useful imagery of the scene, and important features identified within the scene.

As previously mentioned, the one or more sections of optical NLM in the optical path may be formed as reflective optical coatings on the mirrors of the MMA.

Figure 13A:
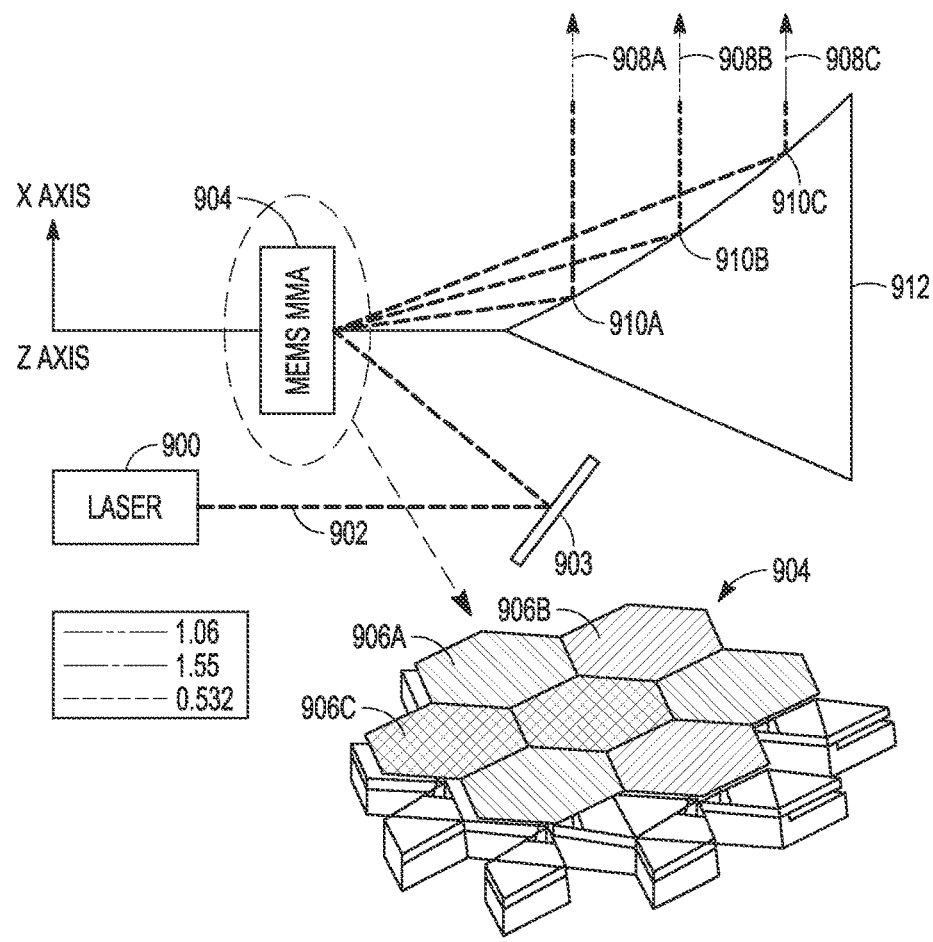
FIGS. 13A and 13B illustrate different embodiments of steered laser transmitter in which the NLM constitutes reflective mirror coatings.

As shown in FIG. 13A, a laser 900 generates a beam 902 that is re-directed off a fold mirror 903 onto a MEMS MMA 904, which includes reflective optical coatings 906A, 906B and 906C that convert a 1.06 micron input wavelength (red) into red, blue (1.55 micron) and green (0.532 micron) output wavelengths. The reflective optical coating 906A for red is a standard optical coating without optical NLM. MEMS MMA 904 wavelength converts and focuses the beam 902 into red, green and blue beams 908A, 908B and 908C that are directed to first, second and third conic sections 910A, 910B and 910C of a fixed mirror 912. The MEMS MMA steers the beams around the conic sections to scan a FOR about the Z axis.

Figure 13B:
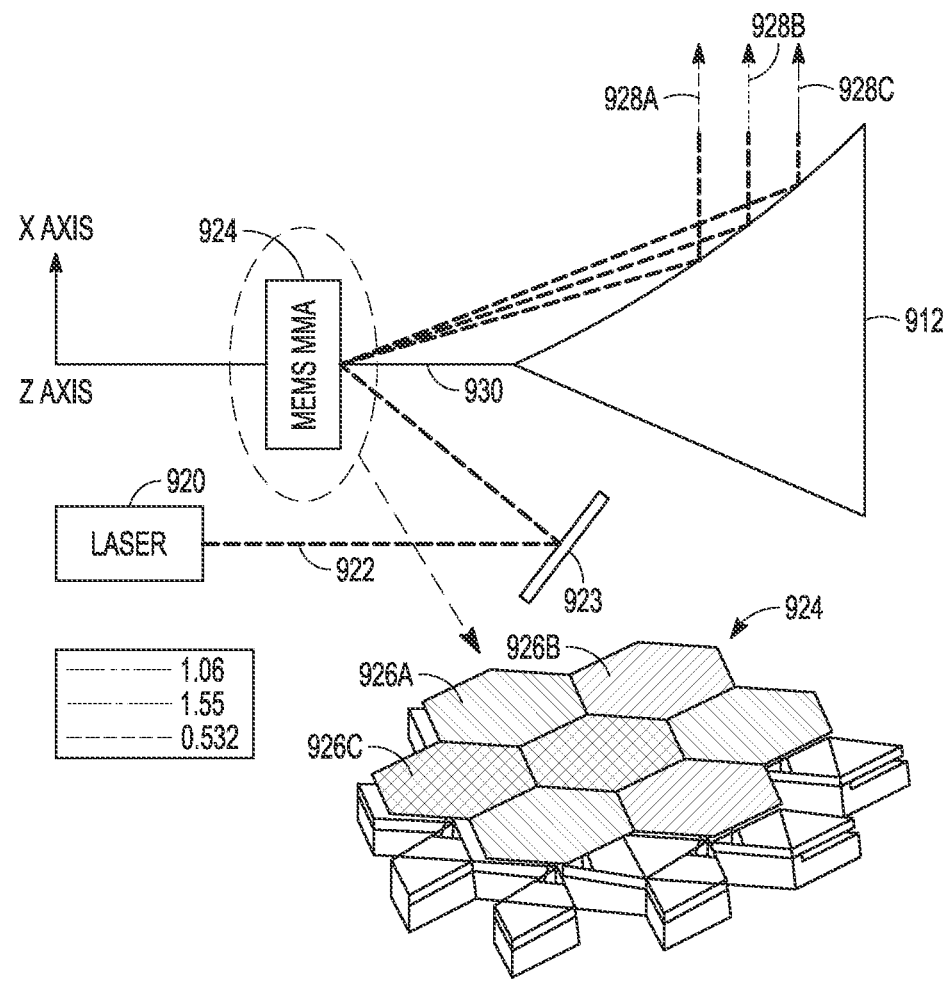

As shown in FIG. 13B, a laser 920 generates a beam 922 that is re-directed off a fold mirror 923 onto a MEMS MMA 924, which includes reflective optical coatings 926A, 926B and 926C that convert a 1.06 micron input wavelength (red) into red, blue (1.55 micron) and green (0.532 micron) output wavelengths. The reflective optical coating 926A for red is a standard optical coating without optical NLM. MEMS MMA 924 wavelength converts and focuses the beam 922 into red, green and blue beams 928A, 928B and 928C that are directed to a single conic section 930 of a fixed mirror 932. The MEMS MMA may steer the beams around the single conic sections to scan a single multi-spectral beam within the FOR about the Z axis or may independently scan the single wavelength beams within the FOR about the Z axis or any combination thereof.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A laser device, comprising:
   a laser configured to generate a beam of optical radiation at an input wavelength;
   a fixed mirror having a first conic section oriented along an optical axis;
   a Micro-Electro-Mechanical System (MEMS) Micro-Mirror Array (MMA) positioned to receive the beam, said MEMS MMA comprising a plurality of mirrors that approximate an off-axis section of a parabolic surface to focus the optical radiation into a collimated spot-beam on the first conic section of the fixed mirror, said mirrors responsive to command signals to at least tip and tilt in two degrees-of-freedom (2 DOF) to re-direct and steer the collimated spot-beam in two-dimensions about the optical axis on the first conic section of the fixed mirror to scan a field-of-regard (FOR) around the optical axis; and
   a first optical non-linear material (NLM) in an optical path of the spot-beam to convert the input wavelength to a different first output wavelength while preserving the steering of the spot-beam over the FOR.

2. The laser device of claim 1, wherein the MEMS MMA is fabricated on a flat substrate in which the mirrors are tipped, tilted and pistoned in three DOF to approximate the off-axis section of the parabolic surface.

3. The laser device of claim 1, wherein the MEMS MMA is fabricated one or more substrates whose shape approximates the off-axis section of the parabolic surface.

4. A laser device, comprising:
   a laser configured to generate a beam of optical radiation at a plurality of input wavelength;
   a fixed mirror having a first conic section oriented along an optical axis;
   a Micro-Electro-Mechanical System (MEMS) Micro-Mirror Array (MMA) positioned to receive the beam, said MEMS MMA comprising a plurality of mirrors responsive to command signals to at least tip and tilt in two degrees-of-freedom (2 DOF) to cause the optical radiation to be focused into a spot-beam on the first conic section of the fixed mirror and to re-direct and steer the spot-beam in two-dimensions about the optical axis on the first conic section of the fixed mirror to scan a field-of-regard (FOR) around the optical axis; and a first annular cylindrical shaped optical element formed of a first optical non-linear material (NLM) oriented along an axis coincident with the optical axis of the first conic section, said steered spot-beam passing through the first annular cylindrical shaped optical element to convert the input wavelength to a different first output wavelength while preserving the steering of the spot-beam over the FOR;

wherein said mirrors include reflective optical coatings configured to reflect at the different input wavelengths, said MEMS MMA responsive to command signals to select mirrors corresponding to a particular input wavelength to form the spot-beam whereby the optical NLM converts the particular input wavelength to a corresponding particular output wavelength.

5. A laser device, comprising:

a laser configured to generate a beam of optical radiation at an input wavelength;

a fixed mirror having a first conic section oriented along an optical axis;

a Micro-Electro-Mechanical System (MEMS) Micro-Mirror Array (MMA) positioned to receive the beam, said MEMS MMA comprising a plurality of mirrors responsive to command signals to at least tip and tilt in two degrees-of-freedom (2 DOF) to cause the optical radiation to be focused into a spot-beam on the first conic section of the fixed mirror and to re-direct and steer the spot-beam in two-dimensions about the optical axis on the first conic section of the fixed mirror to scan a field-of-regard (FOR) around the optical axis; and a first optical non-linear material (NLM) in an optical path of the spot-beam to convert the input wavelength to a different first output wavelength while preserving the steering of the spot-beam over the FOR, wherein at least a plurality of said mirrors include reflective optical coatings that include the first optical NLM such that the spot-beam is re-directed off of the mirrors at the first output wavelength.

6. The laser device of claim 5, wherein at least a different plurality of said mirrors include reflective optical coatings that include a second optical NLM such that the spot-beam is re-directed of the mirrors at second output wavelength different than said first output wavelength.

7. The laser device of claim 5, wherein the fixed mirror comprises only the first conic section, wherein responsive to command signals the MEMS MMA tilts and tips the mirrors to re-direct and steer the spot-beam (a) as a multi-spectral beam including both the first and second output wavelengths or (b) as a single wavelength beam including only one of the first and second output wavelengths.

8. The laser device of claim 5, wherein the fixed mirror includes a second conic section different than said first conic section, said MEMS MMA responsive to command signals to steer a first spot-beam including the first output wavelength to said first conic section and to steer a second spot-beam to said second conic section such that said first and second spot-beam are re-directed from the fixed mirror parallel to each other.

9. The laser device of claim 5, further comprising a first annular cylindrical shaped optical element with a second optical NLM oriented along an axis coincident with the optical axis, said MEMS MMA responsive to command signals to re-direct the beam off of mirrors that include the first optical NLM, the spot-beam through the first annular cylindrical shaped element that includes the second optical NLM or both to select the output wavelength of the spot-beam that scans the FOR.

10. The laser device of claim 5, wherein the fixed mirror includes a second conic section different than said first conic section, said second conic section configured to redirect the spot-beam parallel to the redirected collimated spot-beam from the first conic section whereby the spot-beam is transmitted at a second output wavelength different than said first output wavelength, said MEMS MMA responsive to command signals to steer the spot-beam to said first and second different conic sections to scan a multispectral spot-beam over the FOR.

11. The laser device of claim 5, wherein the fixed mirror includes a second conic section different than said first conic section, said MEMS MMA responsive to command signals to shape the spot-beam to have an oblong shape whose major axis is oriented along the optical axis so that the spot-beam covers both the first and second conic sections to simultaneously generate a multispectral spot-beam.

12. The laser device of claim 5, wherein said MEMS MMA responsive to command signals partitions the mirrors to separate the beam into a plurality of spot-beams and steer the plurality of spot-beams about the first conic shape to scan the plurality of spot-beams in the FOR.

13. The laser device of claim 5, wherein the mirrors tip, tilt and piston in 3 DOF to shape a wavefront of the spot-beam.

14. A laser device, comprising:

a laser configured to generate a beam of optical radiation at an input wavelength;

a parabolic mirror having a central hole through which the beam of optical radiation passes from the laser, a fixed mirror having a first conic section oriented along an optical axis;

a Micro-Electro-Mechanical System (MEMS) Micro-Mirror Array (MMA) positioned to receive the beam, said MEMS MMA comprising a plurality of mirrors responsive to command signals to at least tip and tilt in two degrees-of-freedom (2 DOF) to steer the beam onto different off-axis sections of the parabolic mirror that re-directs and focuses the beam into a spot-beam at different locations on the first conic section of the fixed mirror and to re-direct and steer the spot-beam in two-dimensions about the optical axis on the first conic section of the fixed mirror to scan a field-of-regard (FOR) around the optical axis; and a first optical non-linear material (NLM) in an optical path of the spot-beam to convert the input wavelength to a different first output wavelength while preserving the steering of the spot-beam over the FOR.

15. A laser device, comprising:

a laser configured to generate a beam of optical radiation at an input wavelength; and a Micro-Electro-Mechanical System (MEMS) Micro-Mirror Array (MMA) positioned to receive the beam, said MEMS MMA comprising a plurality of mirrors which have reflective coatings formed of at least a first optical non-linear material (NLM) to convert the input wavelength to a different first output wavelength, said mirrors responsive to command signals to at least tip and tilt in two degrees-of-freedom (2 DOF) to steer the spot-beam in two-dimensions to scan a field-of-regard (FOR).

16. The laser device of claim 15, wherein a plurality of said mirrors have reflective coatings formed of a second optical NLM to convert the input wavelength to a different second output wavelength.

17. The laser device of claim 16, further comprising a fixed mirror having a first conic section, said MEMS MMA responsive to command signals to form and steer a multi-spectral spot beam including both the first and second output wavelengths about said first conic section over the FOR.

18. The laser device of claim 16, wherein the mirrors tip, tilt and piston in 3 DOF to shape a wavefront of the spot-beam.

19. A laser device, comprising:
- a laser configured to generate a beam of optical radiation at an input wavelength;
- a Micro-Electro-Mechanical System (MEMS) Micro-Mirror Array (MMA) positioned to receive the beam, said MEMS MMA comprising a plurality of mirrors responsive to command signals to at least tip, tilt and piston in three degrees-of-freedom (3 DOF) to shape the wavefront of the beam and steer the beam in two-dimensions to scan a field-of-regard (FOR); and
- a first optical non-linear material (NLM) in an optical path of the beam to convert the input wavelength to a different first output wavelength while preserving the steering of the beam over the FOR,
- wherein at least a plurality of said mirrors include reflective optical coatings that include the first optical NLM such that the beam is re-directed off of the mirrors at the first output wavelength.

20. The laser device of claim 19, further comprising a fixed mirror having a first conic section, said MEMS MMA responsive to command signals to focus the beam into a spot-beam on the first conic section and steer the spot-beam over the FOR.

* * * * *

UNITED STATES PATENT AND TRADEMARK OFFICE
CERTIFICATE OF CORRECTION

PATENT NO. : 12,117,607 B2
APPLICATION NO. : 17/242861
DATED : October 15, 2024
INVENTOR(S) : Gleason et al.

It is certified that error appears in the above-identified patent and that said Letters Patent is hereby corrected as shown below:

On the Title Page

Item [57], in Column 2, Line 4, delete "Micro-Minor" and insert --Micro-Mirror-- therefor In the Specification In Column 3, Line 20, delete "fiat" and insert --flat-- therefor In Column 4, Line 12, delete "different]output" and insert --different output-- therefor In Column 7, Line 14, delete "36" and insert --35-- therefor In Column 7, Line 21, delete "36" and insert --35-- therefor In Column 10, Line 62, delete "20S" and insert --205-- therefor In Column 10, Line 63, delete "fold-mirror" and insert --fold mirror-- therefor In Column 11, Line 29, delete "sidewalk" and insert --sidewalls-- therefor In Column 11, Line 42, delete "sidewalk" and insert --sidewalls-- therefor In Column 13, Line 18, delete "46." and insert --40.-- therefor In Column 13, Line 21, after "of", insert --Phi--

In Column 13, Line 44, delete "518" and insert --516-- therefor

In Column 13, Line 47, delete "518." and insert --516.-- therefor

Signed and Sealed this
Twelfth Day of August, 2025

Coke Morgan Stewart
*Acting Director of the United States Patent and Trademark Office*

In Column 14, Line 20, delete "118" and insert --618-- therefor

In Column 14, Line 38, delete "127," and insert --627,-- therefor

In Column 14, Line 40, delete "131." and insert --631.-- therefor

In Column 14, Line 58, delete "fiat" and insert --flat-- therefor

In Column 15, Line 7, delete "in 709" and insert --709 in-- therefor

In the Claims

In Column 18, Line 4, in Claim 10, after "redirected", delete "collimated"